US008598244B2

(12) United States Patent   (10) Patent No.: US 8,598,244 B2
Handa et al.   (45) Date of Patent: *Dec. 3, 2013

(54) REDUCED-VOC AND NON-VOC BLOWING AGENTS FOR MAKING EXPANDED AND EXTRUDED THERMOPLASTIC FOAMS

(75) Inventors: Y. Paul Handa, Pittsford, NY (US); Gary A. Francis, Canandaigua, NY (US); Glenn C. Castner, Victor, NY (US); Mohammad Zafar, Pittsford, NY (US)

(73) Assignee: Pactiv LLC, Lake Forerst, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 13/617,329

(22) Filed: Sep. 14, 2012

(65) Prior Publication Data

US 2013/0011648 A1   Jan. 10, 2013

Related U.S. Application Data

(63) Continuation of application No. 11/680,170, filed on Feb. 28, 2007, now Pat. No. 8,309,619, which is a continuation-in-part of application No. 11/367,652, filed on Mar. 3, 2006, now abandoned, which is a continuation-in-part of application No. 11/151,814, filed on Jun. 13, 2005, now abandoned, which is a continuation-in-part of application No. 11/122,158, filed on May 3, 2005, now abandoned, which is a continuation-in-part of application No. 11/016,312, filed on Dec. 17, 2004, now Pat. No. 7,312,253, which is a continuation-in-part of application No. 10/934,832, filed on Sep. 3, 2004, now Pat. No. 7,307,105.

(51) Int. Cl.
*C08J 9/00* (2006.01)

(52) U.S. Cl.
USPC ............... 521/79; 521/98; 521/142; 521/146

(58) Field of Classification Search
USPC ..................... 521/79, 98, 142, 146
See application file for complete search history.

(56) References Cited

U.S. PATENT DOCUMENTS

| | | |
|---|---|---|
| 2,816,827 A | 12/1957 | Roth |
| 2,861,898 A | 11/1958 | Platzer |
| 2,911,382 A | 11/1959 | Barkhuff |
| 2,983,962 A | 5/1961 | Merz |
| 3,085,073 A | 4/1963 | Lintner |
| 3,089,857 A | 5/1963 | Pottenger |
| 3,281,259 A | 10/1966 | Lux et al. |
| 3,290,198 A | 12/1966 | Lux et al. |
| 3,358,060 A | 12/1967 | Ohsol |
| 3,358,073 A | 12/1967 | Gamble |
| 3,379,799 A | 4/1968 | Goldman |
| 3,407,151 A | 10/1968 | Overcashier |
| 3,409,199 A | 11/1968 | Lake |
| 3,577,360 A | 5/1971 | Immel |
| 3,644,230 A | 2/1972 | Cronin |
| 3,670,916 A | 6/1972 | Alpert |
| 3,759,641 A | 9/1973 | Immel |
| 3,855,377 A | 12/1974 | Uebelhart |
| 3,864,444 A | 2/1975 | Johnson |
| 3,900,433 A | 8/1975 | Taub et al. |
| 3,914,191 A | 10/1975 | Scott |
| 3,929,686 A | 12/1975 | Stevenson |
| 3,961,000 A | 6/1976 | Ropiequet |
| 3,962,154 A | 6/1976 | Egli |
| 3,976,605 A | 8/1976 | Matsunaga et al. |
| 4,009,976 A | 3/1977 | Johnson |
| 4,033,010 A | 7/1977 | McCalla |
| 4,033,910 A | 7/1977 | Papa |
| 4,042,658 A | 8/1977 | Collins |
| 4,098,941 A | 7/1978 | Johnson |
| 4,104,440 A | 8/1978 | Collins |
| 4,214,054 A | 7/1980 | Watanabe et al. |
| 4,239,727 A | 12/1980 | Myers et al. |
| 4,272,469 A | 6/1981 | Smith |
| 4,323,528 A | 4/1982 | Collins |
| 4,557,881 A | 12/1985 | Rabotski |
| 4,695,595 A | 9/1987 | Blount |
| 4,769,396 A | 9/1988 | Blount |
| 4,894,395 A | 1/1990 | Park |
| 4,916,166 A | 4/1990 | Suh et al. |

(Continued)

FOREIGN PATENT DOCUMENTS

DE   4230097   5/1994
DE   19824134   12/1999

(Continued)

OTHER PUBLICATIONS

U.S. Appl. No. 13/617,200, filed Sep. 14, 2012.
U.S. Appl. No. 11/016,312, filed Nov. 5, 2007 Issue Fee payment.
U.S. Appl. No. 11/016,312, filed Oct. 30, 2007 Amendment after Notice of Allowance.
U.S. Appl. No. 11/016,312, filed Oct. 16, 2007 Supplemental Notice of Allowability.
U.S. Appl. No. 11/016,312, filed Sep. 14, 2007 Notice of Allowance.
U.S. Appl. No. 11/016,312, filed Jul. 30, 2007 Response to Non-Final Office Action.

(Continued)

*Primary Examiner* — Irina S Zemel
(74) *Attorney, Agent, or Firm* — Baker Botts L.L.P.

(57) ABSTRACT

A blowing agent blend for making thermoplastic polymer foams includes methyl formate. The blowing agent blend can further comprise at least one co-blowing agent. The co-blowing agent is either a physical co-blowing agent (e.g. an inorganic agent, a hydrocarbon, a halogenated hydrocarbon, a hydrocarbon with polar, functional group(s), water or any combination thereof), or a chemical co-blowing agent, or combinations thereof. The thermoplastic polymer foam can be an alkenyl aromatic polymer foam, e.g. a polystyrene foam. The blowing agent blend includes methyl formate and one or more co-blowing agents. The methyl formate-based blowing agent blends produce dimensionally stable foams that have improved resistance to flame spread. A process for the preparation of such foams is also provided.

17 Claims, 11 Drawing Sheets

(56) References Cited

U.S. PATENT DOCUMENTS

| | | |
|---|---|---|
| 4,943,459 A | 7/1990 | Nedzu et al. |
| 4,960,804 A | 10/1990 | Doerge |
| 4,997,858 A | 3/1991 | Jourquin et al. |
| 5,026,736 A | 6/1991 | Pontiff |
| 5,059,376 A | 10/1991 | Pontiff et al. |
| 5,064,872 A | 11/1991 | Monstrey et al. |
| 5,106,880 A | 4/1992 | Miller et al. |
| 5,110,838 A | 5/1992 | Tokiwa et al. |
| 5,116,880 A | 5/1992 | Tokiwa et al. |
| 5,120,481 A | 6/1992 | Brackman et al. |
| 5,134,171 A | 7/1992 | Hammel et al. |
| 5,149,473 A | 9/1992 | LeDuc |
| 5,166,182 A | 11/1992 | Blanpied |
| 5,210,108 A | 5/1993 | Spinu et al. |
| 5,216,050 A | 6/1993 | Sinclair |
| 5,225,490 A | 7/1993 | Tokiwa et al. |
| 5,227,408 A | 7/1993 | Hanna et al. |
| 5,242,494 A | 9/1993 | Callaghan et al. |
| 5,252,642 A | 10/1993 | Sinclair et al. |
| 5,283,003 A | 2/1994 | Chen |
| 5,308,528 A | 5/1994 | Desbiendras et al. |
| 5,336,696 A | 8/1994 | Ashida |
| 5,348,983 A | 9/1994 | Sterzel |
| 5,378,792 A | 1/1995 | Sterzel |
| 5,391,335 A | 2/1995 | Sakamoto et al. |
| 5,422,053 A | 6/1995 | Sterzel |
| 5,437,924 A | 8/1995 | Decker et al. |
| 5,439,947 A | 8/1995 | Bartlett et al. |
| 5,447,962 A | 9/1995 | Ajioka et al. |
| 5,478,494 A | 12/1995 | Lee et al. |
| 5,478,792 A | 12/1995 | Seno et al. |
| 5,532,284 A | 7/1996 | Bartlett et al. |
| 5,563,180 A | 10/1996 | Skowronski et al. |
| 5,565,497 A | 10/1996 | Godbey et al. |
| 5,699,946 A | 12/1997 | Hashimoto et al. |
| 5,736,586 A | 4/1998 | Bastioli et al. |
| 5,750,584 A | 5/1998 | Knaus |
| 5,759,569 A | 6/1998 | Hird et al. |
| 5,763,518 A | 6/1998 | Gnatowski et al. |
| 5,780,521 A | 7/1998 | Shmidt et al. |
| 5,786,401 A | 7/1998 | Inagaki et al. |
| 5,853,848 A | 12/1998 | Fisk |
| 5,912,279 A | 6/1999 | Hammel et al. |
| 5,922,348 A | 7/1999 | Wegner et al. |
| 5,965,231 A | 10/1999 | Rotermund et al. |
| 6,080,798 A | 6/2000 | Handa et al. |
| 6,136,875 A | 10/2000 | Wu et al. |
| 6,184,261 B1 | 2/2001 | Biby et al. |
| 6,310,112 B1 | 10/2001 | Vo et al. |
| 6,315,932 B1 | 11/2001 | Fujiwara et al. |
| 6,355,341 B1 | 3/2002 | Chaudhary et al. |
| 6,355,701 B1 | 3/2002 | Soukup et al. |
| 6,476,080 B2 | 11/2002 | Duffy et al. |
| 6,521,675 B1 | 2/2003 | Wu |
| 6,526,764 B1 | 3/2003 | Singh et al. |
| 6,569,912 B1 | 5/2003 | Oohara et al. |
| 6,599,946 B2 | 7/2003 | Duffy et al. |
| 6,696,504 B1 | 2/2004 | Hayashi et al. |
| 6,710,135 B2 | 3/2004 | Tan et al. |
| 6,740,731 B2 | 5/2004 | Bigg et al. |
| 6,753,357 B2 | 6/2004 | Kalinowski et al. |
| 6,762,212 B2 | 7/2004 | Oohara et al. |
| 6,787,580 B2 | 9/2004 | Chonde et al. |
| 6,841,581 B2 | 1/2005 | Hayashi et al. |
| 7,045,556 B2 | 5/2006 | Handa et al. |
| 7,166,248 B2 | 1/2007 | Francis et al. |
| 7,307,105 B2 | 12/2007 | Handa et al. |
| 7,312,253 B2 | 12/2007 | Handa et al. |
| 7,358,282 B2 | 4/2008 | Krueger et al. |
| 2002/0198273 A1 | 12/2002 | Nyberg et al. |
| 2003/0078312 A1 | 4/2003 | Hibino et al. |
| 2003/0114549 A1 | 6/2003 | Kalinowski et al. |
| 2004/0006149 A1 | 1/2004 | Handa et al. |
| 2004/0024077 A1 | 2/2004 | Braun et al. |
| 2004/0132844 A1 | 7/2004 | Francis et al. |
| 2005/0131094 A1 | 6/2005 | Kalinowski et al. |
| 2005/0154114 A1 | 7/2005 | Hale |
| 2006/0052465 A1 | 3/2006 | Handa et al. |
| 2006/0052466 A1 | 3/2006 | Handa |
| 2006/0091576 A1 | 5/2006 | Takase et al. |
| 2006/0167122 A1 | 7/2006 | Haraguchi et al. |
| 2006/0211782 A1 | 9/2006 | Handa et al. |
| 2007/0004813 A1 | 1/2007 | Shelby et al. |
| 2007/0208094 A1 | 9/2007 | Handa et al. |
| 2008/0146686 A1 | 6/2008 | Handa |
| 2009/0012194 A1 | 1/2009 | Okuda et al. |
| 2009/0234035 A1 | 9/2009 | Cheung et al. |

FOREIGN PATENT DOCUMENTS

| | | |
|---|---|---|
| EP | 0 377 230 | 7/1990 |
| EP | 0 450 422 | 10/1991 |
| EP | 0 493 110 | 7/1992 |
| EP | 0 657 495 | 6/1995 |
| EP | 1 975 195 | 10/2008 |
| FR | 2 264 840 | 10/2005 |
| GB | 994074 | 6/1965 |
| JP | 50127965 A | 10/1975 |
| JP | H05505634 | 8/1993 |
| JP | 6041344 | 2/1994 |
| JP | 2004512406 | 4/2004 |
| JP | 2006328318 | 12/2006 |
| JP | 2006348060 | 12/2006 |
| KR | 100185251 | 12/1998 |
| WO | WO 91/13966 | 9/1991 |
| WO | WO 95/02000 | 1/1995 |
| WO | WO 2004/005382 | 1/2004 |
| WO | WO 2007/083705 | 7/2007 |
| WO | WO 2008/028851 | 3/2008 |
| WO | WO 2008/098888 | 8/2008 |

OTHER PUBLICATIONS

U.S. Appl. No. 11/016,312, filed Mar. 28, 2007 Non-Final Office Action.
U.S. Appl. No. 11/016,312, filed Jan. 2, 2007 Response to Notice of Non-Complaint.
U.S. Appl. No. 11/016,312, filed Dec. 5, 2006 Notice of Non-Compliant.
U.S. Appl. No. 11/016,312, filed Sep. 28, 2006 Supplemental Amendment to Final Office Action.
U.S. Appl. No. 11/016,312, filed Sep. 15, 2006 Amendment and Request for Continued Examination (RCE).
U.S. Appl. No. 11/016,312, filed Jul. 14, 2006 Advisory Action.
U.S. Appl. No. 11/016,312, filed Jun. 16, 2006 Response to Final Office Action.
U.S. Appl. No. 11/016,312, filed Mar. 16, 2006 Final Office Action.
U.S. Appl. No. 11/016,312, filed Dec. 29, 2005 Response to Non-Final Office Action.
U.S. Appl. No. 11/016,312, filed Sep. 28, 2005 Non-Final Office Actio.
U.S. Appl. No. 11/122,158, filed May 19, 2008 Notice of Abandonment.
U.S. Appl. No. 11/122,158, filed Oct. 10, 2007 Non-Final Office Action.
U.S. Appl. No. 11/151,814, filed Jul. 25, 2008 Notice of Abandonment.
U.S. Appl. No. 11/151,814, filed Jan. 4, 2008 Non-Final Office Action.
U.S. Appl. No. 11/367,652, filed Oct. 27, 2009 Notice of Abandonment.
U.S. Appl. No. 11/367,652, filed Jun. 30, 2009 Examiner Interview Summary Record.
U.S. Appl. No. 11/367,652, filed Mar. 13, 2009 Non-Final Office Action.
U.S. Appl. No. 10/934,832, filed Oct. 30, 2007 Issue Fee payment.
U.S. Appl. No. 10/934,832, filed Sep. 12, 2007 Notice of Allowance.
U.S. Appl. No. 10/934,832, filed Jul. 17, 2007 Response to Non-Final Office Action.

(56) References Cited

OTHER PUBLICATIONS

U.S. Appl. No. 10/934,832, filed Apr. 17, 2007 Non-Final Office Action.
U.S. Appl. No. 10/934,832, filed Feb. 6, 2007 Amendment and Request for Continued Examination (RCE).
U.S. Appl. No. 10/934,832, filed Aug. 10, 2006 Final Office Action.
U.S. Appl. No. 10/934,832, filed Jun. 5, 2006 Response to Non-Final Office Action.
U.S. Appl. No. 10/934,832, filed Mar. 3, 2006 Non-Final Office Action.
U.S. Appl. No. 10/934,832, filed Jan. 5, 2006 Terminal Disclaimer Review Decision.
U.S. Appl. No. 10/934,832, filed Dec. 12, 2005 Response to Non-Final Office Action and Terminal Disclaimer filed.
U.S. Appl. No. 10/934,832, filed Sep. 28, 2005 Non-Final Office Action.
U.S. Appl. No. 11/680,170, filed Oct. 9, 2012 Issue Fee payment.
U.S. Appl. No. 11/680,170, filed Jul. 25, 2012 Notice of Allowance.
U.S. Appl. No. 11/680,170, filed Jul. 12, 2012 Response to Non-Final Office Action.
U.S. Appl. No. 11/680,170, filed Jul. 11, 2012 Non-Final Office Action.
U.S. Appl. No. 11/680,170, filed Jul. 9, 2012 Terminal Disclaimer Review Decision.
U.S. Appl. No. 11/680,170, filed Jul. 3, 2012 Terminal Disclaimer filed.
U.S. Appl. No. 11/680,170, filed May 17, 2012 Response to Non-Final Office Action.
U.S. Appl. No. 11/680,170, filed Feb. 17, 2012 Non-Final Office Action.
U.S. Appl. No. 11/680,170, filed Jan. 3, 2011 Amendment and Request for Continued Examination (RCE).
U.S. Appl. No. 11/680,170, filed Oct. 1, 2010 Final Office Action.
Cellular Materials, Encyclopedia of Polymer Science and Technology, J. Wisley and Sons, Article online, copyright 1999-2005.
Cereplast unveils breakthrough bio-based formable resin, Jun. 22, 2009, www.plastemart.com.
de Carvalho et al., "Polyhydroxybutyrate/acrylonitrile-g-(ethylene-co- propylene-co-diene)-g-styrene blends: Their morphology and themal and mechanical behavior," Journal of Applied Polymer Science, vol. 110 Issue 2, pp. 880-889, Jul. 10, 2008.
European Search Report issued on Feb. 2, 2011 in application No. 10183423.2 (corresponding to US 7,307,105).
Flieger M et al., "Biodegradable Plastics from Renewable Sources," Folia Microbiol. (2003);48(1):27-44.
International Search report for PCT/US2007/062492, dated Sep. 18, 2008.
Mohamed et al., "Polycaprolactone/polystyrene bioblends characterized by thermogravimetry, modulated differential scanning calorimetry and infrared photoacoustic spectroscopy," Polymer Degradation and Stability, vol. 92, Issue 7, Jul. 2007, pp. 1177-1185.
Narayan Ramani, "Biobased & Biodegradable Plastics 101," Chemical Engineering & Materials Science.
Nangeroni J. (Oct. 2007). Foam Extrusion and Thermoforming of NatureWorks® BioPolymer. Presented at Polymer Foams 2007, organized by Applied Market Information LLC, Newark, NJ.
Zipfel et al., "The Next Generation Blowing Agents: From One single Product to a Product Range", *Journal of Cellular Plastics*; Abstract only, 1999. (Thomson Innovation Record View on-line May 14, 2012).
Zipfel et al., "The Next Generation Blowing Agents: From One single Product to a Product Range", *Journal of Cellular Plastics*; 35(4):345-364, 1999 (Retrieved on-line May 16, 2012).
U.S. Appl. No. 13/617,200, filed Jun. 4, 2013 Non-Final Office Action.

| Sample | Blowing Agent Composition (wt%)[1] | | | | | | | | BA Input | Talc | Density | Open Cell | Cell Size[4] | %Gauge Change[5] | |
|---|---|---|---|---|---|---|---|---|---|---|---|---|---|---|---|
| BA/Unit | C2 | C3 | iC4 | nC4 | iC5 | CO2 | Methyl Formate | H2O | wt%[2] | wt%[3] | lb/ft³ | % | micron | 1 hr | 7 days |
| Comp 1 | | | | | 100 | | | | 5.20 | 1.8 | 5.5 | 1.8 | 200 | 0.8 | 11.1 |
| Comp 2 | | | | | 83.7 | 16.3 | | | 4.73 | 1.0 | 4.7 | 1.0 | 196 | -7.9 | 12.9 |
| Inv 1 | | | | | | | 100 | | 4.30 | 1.9 | 8.1 | 2.2 | 187 | -0.3 | 5.6 |
| Inv 2 | | | | | 18.6 | 81.4 | | | 4.08 | 0.5 | 5.6 | 5.6 | 209 | -10.6 | -3.9 |
| Inv 3 | | | | | 17.0 | 66.1 | | 16.9 | 2.95 | 0.7 | 8.6 | 23.5 | 170 | -0.3 | 21.7 |
| Inv 4 | 13.7 | | | | | 86.3 | | | 4.08 | 0.7 | 5.8 | 2.2 | 234 | -1.1 | 4.7 |
| Inv 5 | 29.4 | | | | | 70.6 | | | 3.40 | 0.6 | 4.1 | 1.8 | 179 | -0.1 | 7.6 |
| Inv 6 | | 32.6 | | | 14.7 | 52.7 | | | 3.74 | 0.5 | 4.4 | 3.0 | 210 | -6.6 | 9.0 |
| Inv 7 | | 56.0 | | | 10.3 | 33.7 | | | 3.59 | 0.3 | 3.6 | 1.5 | 224 | 0.1 | 15.1 |
| Inv 8 | | 79.7 | | | 10.2 | 10.1 | | | 3.35 | 0.3 | 3.5 | 3.5 | 254 | 0.6 | 9.5 |
| Inv 9 | | | 85.2 | | 8.4 | 6.4 | | | 4.19 | 1.0 | 4.1 | 1.8 | 194 | 0.1 | 11.9 |
| Inv 10 | | | 73.6 | | 8.5 | 17.9 | | | 4.13 | 1.0 | 4.0 | 1.9 | 197 | -0.3 | 13.2 |
| Inv 11 | | | 64.2 | | 7.5 | 28.3 | | | 4.13 | 1.0 | 3.9 | 0.9 | 166 | 0.5 | 13.7 |
| Inv 12 | | | 48.1 | | 8.8 | 43.1 | | | 4.22 | 1.0 | 4.9 | 2.5 | 183 | -3.5 | 22.1 |
| Inv 13 | | | | 61.0 | 17.1 | 21.9 | | | 4.57 | 1.0 | 5.3 | 3.0 | 180 | -5.5 | 10.7 |
| Inv 14 | | | | 62.9 | 8.4 | 28.7 | | | 4.18 | 1.4 | 4.7 | 1.7 | 163 | -7.7 | 18.4 |

BA: blowing agent; C2 = ethane, C3 = propane, iC4 = isobutane, nC4 = normal butane, iC5 = isopentane Comp = comparative example; Inv = inventive example

[1] wt% = 100 × (weight of a blowing agent)/(total weight of all blowing agents)

[2] wt% = 100 × (weight of all blowing agents)/(total weight of foaming formulation including all the blowing agent(s), polymer resin(s), and additives)

[3] wt% = 100 × (weight of talc)/(total weight of foaming formulation including all the blowing agent(s), polymer resin(s), and additives)

[4] The number of cells per inch of the extruded foam ranged from 210 to 420. Cell size (expressed as diameter) was determined from scanning electron microscope image of the extruded sheet that has been aged at least 24 hours and then expanded in the z-direction (along the thickness direction) in a 240°F oil bath for 2 minutes, while being mechanically constrained in the x and y directions; the number of cells per inch in these further expanded samples ranged from 110 to 210.

[5] %Gauge Change = 100 × (aged gauge − initial gauge)/initial gauge; initial gauge determined within 15 minutes of extrusion

Figure 5

| Sample | Blowing Agent Composition (wt%)[1] | | | BA Input | Talc | Density | Open Cell | Cell Size[4] | %Gauge Change[5] | |
|---|---|---|---|---|---|---|---|---|---|---|
| BA/Unit | iC5 | CO2 | MF | wt%[2] | wt%[3] | lb/ft³ | % | micron | 1 hr | 7 days |
| Comp 1 | 88.5 | 11.5 | 0.0 | 5.40 | 0.70 | 4.0 | 3.0 | 188 | -1.5 | 8.2 |
| Inv 1 | 72.1 | 10.3 | 17.6 | 5.35 | 0.61 | 3.7 | 3.3 | 162 | -1.3 | 4.7 |
| Inv 2 | 62.8 | 8.8 | 28.4 | 5.37 | 0.51 | 3.9 | 1.7 | 169 | -0.5 | 4.2 |
| Inv 3 | 53.2 | 9.8 | 37.0 | 5.32 | 0.75 | 3.7 | 6.0 | 171 | -3.7 | 2.8 |
| Inv 4 | 53.1 | 9.3 | 37.6 | 5.46 | 0.47 | 3.7 | 2.9 | 189 | -1.7 | 2.9 |

BA: blowing agent; iC5 – isopentane, MF – (97 wt% methyl formate + 3 wt% methanol)

Comp = comparative example; Inv = inventive example

[1] wt% = 100 x (weight of a blowing agent)/(total weight of all blowing agents)

[2] wt% = 100 x (weight of all blowing agents)/(total weight of foaming formulation including all the blowing agent(s), polymer resin(s), and additives)

[3] wt% = 100 x (weight of talc)/(total weight of foaming formulation including all the blowing agent(s), polymer resin(s), and additives)

[4] Cell size (expressed as diameter) was determined from scanning electron microscope image of the thermoformed parts

[5] %Gauge Change = 100 x (aged gauge – initial gauge)/initial gauge; initial gauge determined within 15 minutes of extrusion

Figure 6

| Sample | Blowing Agent Composition (wt%)[1] | | | BA Input | Talc | Density | Open Cell | Cell Size[4] | %Gauge Change[5] | |
|---|---|---|---|---|---|---|---|---|---|---|
| BA/Unit | iC4 | CO2 | MF | wt%[2] | wt%[3] | lb/ft³ | % | micron | 1 hr | 7 days |
| Comp 1 | 100 | 0.0 | 0.0 | 3.39 | 0.24 | 6.7 | 3.0 | 279 | 1.3 | 4.8 |
| Inv 1 | 69.0 | 0.0 | 31.0 | 3.45 | 0.29 | 6.4 | 3.0 | 252 | 1.7 | 7.6 |
| Inv 2 | 59.2 | 0.0 | 40.8 | 3.41 | 0.38 | 6.4 | 4.8 | 251 | 1.1 | 8.9 |
| Inv 3 | 50.0 | 0.0 | 50.0 | 3.46 | 0.48 | 6.7 | 3.6 | 233 | 1.3 | 10.0 |
| Inv 4 | 36.7 | 0.0 | 63.3 | 3.68 | 0.57 | 6.3 | 3.1 | 272 | -0.3 | 8.6 |
| Inv 5 | 28.3 | 8.2 | 63.5 | 3.64 | 0.43 | 6.1 | 3.5 | - | - | - |
| Inv 6 | 19.3 | 15.0 | 65.7 | 3.52 | 0.24 | 5.7 | 5.7 | - | - | - |

BA: blowing agent; iC4 = isobutane, MF = (97 wt% methyl formate + 3 wt% methanol)

Comp = comparative example; Inv = inventive example

[1] wt% = 100 x (weight of a blowing agent)/(total weight of all blowing agents)

[2] wt% = 100 x (weight of all blowing agents)/(total weight of foaming formulation including all the blowing agent(s), polymer resin(s), and additives)

[3] wt% = 100 x (weight of talc)/(total weight of foaming formulation including all the blowing agent(s), polymer resin(s), and additives)

[4] Cell size (expressed as diameter) was determined from scanning electron microscope image of the thermoformed parts

[5] %Gauge Change = 100 x (aged gauge − initial gauge)/initial gauge; initial gauge determined within 15 minutes of extrusion

Figure 7

| Inventive Example | 1 | 2 | 3 | 4 | 5 | 6 | 7 | 8 |
|---|---|---|---|---|---|---|---|---|
| PS1 (wt%)[1] | 99.00 | 66.00 | 66.00 | 66.00 | 66.00 | 66.00 | 66.00 | 50.00 |
| PS2 (wt%)[1] | 0.00 | 32.35 | 0.00 | 0.00 | 0.00 | 0.00 | 0.00 | 0.00 |
| PS3 (wt%)[1] | 0.00 | 0.00 | 32.35 | 32.35 | 32.68 | 32.68 | 32.68 | 50.00 |
| Talc (wt%)[1] | 1.00 | 1.65 | 1.65 | 1.65 | 1.32 | 1.32 | 1.32 | 0.00 |
| Methyl Formate (pph)[2] | 2.42 | 2.61 | 3.42 | 4.72 | 4.07 | 4.24 | 3.95 | 3.73 |
| HFC-134a (pph)[2] | 2.01 | 2.73 | 5.17 | 4.72 | 3.99 | 5.50 | 6.17 | 5.83 |
| $CO_2$ (pph)[2] | 0.00 | 0.00 | 0.00 | 0.00 | 0.36 | 0.00 | 0.00 | 0.00 |
| Methyl Formate (wt%)[3] | 54.6 | 48.9 | 39.8 | 50.0 | 48.3 | 43.5 | 39.0 | 39.0 |
| HFC-134a (wt%)[3] | 45.4 | 51.1 | 60.2 | 50.0 | 47.4 | 56.5 | 61.0 | 61.0 |
| $CO_2$ (wt%)[3] | 0.0 | 0.0 | 0.0 | 0.0 | 4.3 | 0.0 | 0.0 | 0.0 |
| Melt temp (°C)[4] | 149 | 141 | 131 | 121 | 122 | 121 | 120 | 121 |
| Fresh Density (pcf)[5,6] | 3.88 | 3.15 | 2.70 | 2.52 | 2.67 | 2.67 | 2.86 | 2.70 |
| Fresh R-Value (/inch)[5,7] | 5.31 | 5.80 | 5.82 | 6.11 | 5.82 | 6.02 | 6.15 | 6.10 |
| 7-day R-value (/inch)[7] | 4.36 | 4.63 | 4.64 | 4.78 | 4.65 | 4.84 | 5.01 | 4.94 |
| Cell size, MD (mm)[8,9] | 0.222 | 0.181 | 0.221 | 0.246 | 0.223 | 0.212 | 0.192 | 0.236 |
| Cell size, TD (mm)[8,9] | 0.245 | 0.224 | 0.234 | 0.223 | 0.229 | 0.197 | 0.267 | 0.285 |
| Cell size, ND (mm)[8,9] | 0.274 | 0.221 | 0.258 | 0.259 | 0.253 | 0.217 | 0.245 | 0.250 |

[1] wt% = 100 x (weight of component )/(weight of PS1 + PS2 + PS3 + talc))
[2] pph = parts blowing agent component per hundred parts of (PS1 + PS2 + PS3 + talc)
[3] wt% = 100 x (weigt of a blowing agent)/(total weight of all blowing agents)
[4] The temperature just before the foaming formulation enters the die.
[5] Fresh measurements made within 15 minutes of extrusion
[6] Density determined by measuring dimensions and mass of a nominal 4" x 15" x 0.5" sample
[7] R is in $ft^2 \cdot hr \cdot °F/Btu$. Thermal resistivity determined using ASTM C518
[8] Cell size determined using ASTM D3576
[9] MD, TD, and ND - machine, transverse, and normal direction, respectively

Figure 8

| Example | Comp 1 | Comp 2 | Comp 3 | Comp 4 | Comp 5 | Inv 1 | Inv 2 | Inv 3 | Inv 4 | Inv 5 |
|---|---|---|---|---|---|---|---|---|---|---|
| PS1 (wt%)[1] | 58.0 | 58.0 | 58.0 | 58.0 | 58.0 | 58.0 | 58.0 | 58.0 | 58.0 | 58.0 |
| PS2 (wt%)[1] | 38.0 | 38.0 | 38.0 | 38.0 | 38.0 | 38.0 | 38.0 | 38.0 | 38.0 | 38.0 |
| FR (wt%)[1] | 2.0 | 2.0 | 2.0 | 2.0 | 2.0 | 2.0 | 2.0 | 2.0 | 2.0 | 2.0 |
| Talc (wt%)[1] | 2.0 | 2.0 | 2.0 | 2.0 | 2.0 | 2.0 | 2.0 | 2.0 | 2.0 | 2.0 |
| Ethyl Chloride (pph)[2] | 2.35 | 2.58 | 2.68 | 2.69 | 2.81 | 0.00 | 0.00 | 0.00 | 0.00 | 0.00 |
| Methyl Formate (pph)[2] | 0.00 | 0.00 | 0.00 | 0.00 | 0.00 | 2.17 | 2.35 | 2.63 | 2.61 | 2.92 |
| HCFC-142b (pph)[2] | 5.48 | 6.01 | 6.24 | 6.27 | 6.43 | 5.64 | 6.06 | 6.68 | 6.64 | 6.74 |
| Ethyl Chloride (wt%)[3] | 30.0 | 30.0 | 30.0 | 30.0 | 30.4 | 0.0 | 0.0 | 0.0 | 0.0 | 0.0 |
| Methyl Formate (wt%)[3] | 0.0 | 0.0 | 0.0 | 0.0 | 0.0 | 27.8 | 27.9 | 28.2 | 28.2 | 30.2 |
| HCFC-142b (wt%)[3] | 70.0 | 70.0 | 70.0 | 70.0 | 69.6 | 72.2 | 72.1 | 71.8 | 71.8 | 69.8 |
| Melt temp (°C)[4] | 127 | 127 | 127 | 126 | 126 | 133 | 136 | 136 | 126 | 126 |
| Fresh Density (pcf)[5,6] | 2.31 | 2.29 | 2.12 | 2.02 | 2.12 | 2.23 | 2.12 | 1.86 | 2.13 | 2.10 |
| Fresh R-Value (/inch)[5,7] | 6.19 | 6.13 | 6.06 | 6.02 | 6.06 | 6.04 | 5.91 | 5.71 | 6.17 | 6.06 |
| 7-day R-value (/inch)[7] | 4.94 | 4.96 | 4.91 | 4.85 | 4.90 | 4.76 | 4.69 | 4.57 | 4.95 | 4.85 |
| Cell size, MD (mm)[8,9] | 0.361 | 0.337 | 0.386 | 0.340 | 0.330 | 0.304 | 0.366 | 0.421 | 0.369 | 0.379 |
| Cell size, TD (mm)[8,9] | 0.447 | 0.407 | 0.482 | 0.428 | 0.407 | 0.428 | 0.399 | 0.423 | 0.474 | 0.393 |
| Cell size, ND (mm)[8,9] | 0.376 | 0.376 | 0.406 | 0.390 | 0.389 | 0.414 | 0.411 | 0.464 | 0.450 | 0.414 |

*Comp* - comparative example, *Inv* - inventive example

[1] wt% = 100 x (weight of component)/(weight of PS1 + PS2 + FR + talc); FR is flame retardant
[2] pph = parts blowing agent component per hundred parts of (PS1 + PS2 + FR + talc)
[3] wt% = 100 x (weight of a blowing agent)/(total weight of all blowing agents)
[4] The temperature just before the foaming formulation enters the die.
[5] Fresh measurements made within 15 minutes of extrusion
[6] Density determined by measuring dimensions and mass of a nominal 4" x 15" x 0.5" sample
[7] R is in $ft^2 \cdot hr \cdot °F/Btu$. Thermal resistivity determined using ASTM C518
[8] Cell size determined using ASTM D3576
[9] MD, TD, and ND - machine, transverse, and normal direction, respectively

Figure 9

| Example | Comp 1 | Inv 1 | Inv 2 | Comp 2 | Inv 3 | Inv 4 |
|---|---|---|---|---|---|---|
| PS1 (wt%)[1] | 53.56 | 53.56 | 53.56 | 53.56 | 53.56 | 53.56 |
| PS2 (wt%)[1] | 24.28 | 24.28 | 24.28 | 24.28 | 24.28 | 24.28 |
| PS3 (wt%)[1] | 18.23 | 18.23 | 18.23 | 18.23 | 18.23 | 18.23 |
| Talc (wt%)[1] | 1.66 | 1.66 | 1.66 | 1.66 | 1.66 | 1.66 |
| FR (wt%)[1] | 1.60 | 1.60 | 1.60 | 1.60 | 1.60 | 1.60 |
| Color (wt%)[1] | 0.61 | 0.61 | 0.61 | 0.61 | 0.61 | 0.61 |
| MF* (pph)[2] | 0.0 | 3.6 | 3.8 | 0.0 | 5.7 | 5.8 |
| HFC-134a (pph)[2] | 0.0 | 0.0 | 0.0 | 5.9 | 5.4 | 5.5 |
| HCFC-142b (pph)[2] | 7.7 | 7.8 | 8.1 | 0.0 | 0.0 | 0.0 |
| Ethyl Chloride (pph)[2] | 3.4 | 0.0 | 0.0 | 5.3 | 0.0 | 0.0 |
| MF* (wt%)[3] | 0.0 | 31.6 | 31.9 | 0.0 | 51.4 | 51.3 |
| HFC-134a (wt%)[3] | 0.0 | 0.0 | 0.0 | 52.6 | 48.6 | 48.7 |
| HCFC-142b (wt%)[3] | 69.4 | 68.4 | 68.1 | 0.0 | 0.0 | 0.0 |
| Ethyl Chloride (wt%)[3] | 30.6 | 0.0 | 0.0 | 47.4 | 0.0 | 0.0 |
| Melt temp (°C)[4] | 126 | 129 | 129 | 118 | 126 | 127 |
| Fresh Density (pcf)[5,6] | 1.89 | 1.89 | 1.89 | 2.08 | 2.17 | 2.25 |
| Aged Density (pcf)[5,7] | 1.94 | 1.88 | 1.90 | 2.02 | 2.25 | 2.34 |
| Fresh R-Value (/inch)[5,8] | 6.74 | 6.62 | 6.62 | 7.17 | 6.85 | 7.21 |
| Aged R-value (/inch)[9] | 5.31 | 5.24 | 5.28 | 5.21 | 5.27 | 5.51 |
| Cell size, MD (mm)[10,11] | 0.459 | 0.391 | 0.368 | 0.180 | 0.160 | 0.160 |
| Cell size, TD (mm)[10,11] | 0.334 | 0.300 | 0.324 | 0.166 | 0.145 | 0.173 |
| Cell size, ND (mm)[10,11] | 0.368 | 0.340 | 0.363 | 0.186 | 0.158 | 0.169 |

*MF = (97 wt% methyl formate + 3 wt% methanol)

[1] wt% = 100 x (weight of component)/(weight of PS1 + PS2 + PS3 + FR + talc + color); FR is flame retardant

[2] pph = parts blowing agent component per hundred parts of (PS1 + PS2 + PS3 + talc)

[3] wt% = 100 x (weight of a blowing agent)/(total weight of all blowing agents)

[4] The temperature just before the foaming formulation enters the die.

[5] Fresh measurements within 30 minutes of extrusion, aged measuremens after 37 days

[6] Density determined by measuring dimensions and mass of a nominal 5" x 5" x 1" sample

[7] Density measured after aging the foam for 37 days

[8] R is in $ft^2 \cdot hr \cdot °F/Btu$. Thermal resistivity determined using ASTM C518

[9] R-value measured after aging the foam for 45 days

[10] Cell size determined using ASTM D3576

[11] MD, TD, and ND - machine, transverse, and normal direction, respectively

Figure 10

| Sample | Inv 1 | Inv 2 | Inv 3 | Comp 1 |
|---|---|---|---|---|
| PS1 (wt%)[1] | 58.0 | 63.0 | 63.0 | 63.0 |
| PS3 (wt%)[1] | 37.5 | 33.0 | 33.0 | 33.0 |
| Talc (wt%)[1] | 2.5 | 2.0 | 2.0 | 2.0 |
| FR (wt%)[1,2] | 2.0 | 2.0 | 2.0 | 2.0 |
| MF* (pph)[3] | 3.09 | 3.62 | 2.58 | 0.00 |
| HFC-134a (pph)[3] | 0.00 | 5.83 | 5.91 | 4.99 |
| HCFC-142b (pph)[3] | 7.14 | 0.00 | 0.00 | 0.00 |
| Cyclopentane (pph)[3] | 0.00 | 2.23 | 0.00 | 0.00 |
| Isopentane (pph)[3] | 0.00 | 0.00 | 2.69 | 4.08 |
| MF* (wt%)[4] | 30.2 | 31.0 | 23.1 | 0.0 |
| HFC-134a (wt%)[4] | 0.0 | 49.9 | 52.9 | 55.0 |
| HCFC-142b (wt%)[4] | 69.8 | 0.0 | 0.0 | 0.0 |
| Cyclopentane (wt%)[4] | 0.0 | 19.1 | 0.0 | 0.0 |
| Isopentane (wt%)[4] | 0.0 | 0.0 | 24.0 | 45.0 |
| Melt temp (°C)[5] | 126 | 121 | 121 | 134 |
| Fresh Density (pcf)[6,7] | 2.09 | 2.23 | 2.32 | 2.45 |
| Fresh R-Value (/inch)[6,8] | 6.12 | 6.11 | 6.21 | 5.82 |
| 7-day R-value (/inch)[8] | 4.81 | 4.98 | 5.15 | 5.05 |
| B (burn rate) (inch/min) | 0.6 | 7.6 | 29.8 | 90.3 |

*MF = (97 wt% methyl formate + 3 wt% methanol)

[1] wt% = 100 x (weight of component)/(weight of PS1 + PS2 + PS3 + talc + FR)

[2] FR = flame retardant

[3] pph = parts blowing agent component per hundred parts of (PS1 + PS2 + PS3 + talc + FR)

[4] wt% = 100 x (weight of a blowing agent)/(total weight of all blowing agents)

[5] The temperature just before the foaming formulation enters the die

[6] Fresh measurements made within 15 minutes of extrusion

[7] Density determined by measuring dimensions and mass of a nominal 4" x 15" x 0.5" sample

[8] R is in $ft^2 \cdot hr \cdot °F/Btu$. Thermal resistivity determined using ASTM C518

Figure 11

REDUCED-VOC AND NON-VOC BLOWING AGENTS FOR MAKING EXPANDED AND EXTRUDED THERMOPLASTIC FOAMS

CROSS REFERENCE TO RELATED APPLICATIONS

This application is continuation of U.S. application Ser. No. 11/680,170, filed Feb. 28, 2007, now U.S. Pat. No. 8,309,619 which is a continuation-in-part of U.S. application Ser. No. 11/367,652, filed on Mar. 3, 2006, now abandoned which is a continuation-in-part of U.S. application Ser. No. 11/151,814, filed Jun. 13, 2005, now abandoned which is a continuation-in-part of U.S. application Ser. No. 11/122,158, filed May 3, 2005, now abandoned which is a continuation-in-part of U.S. application Ser. No. 11/016,312, filed Dec. 17, 2004, now U.S. Pat. No. 7,312,253, which is a continuation-in-part of U.S. application Ser. No. 10/934,832, filed Sep. 3, 2004, now U.S. Pat. No. 7,307,105, the disclosure of each of which is incorporated by reference herein in its entirety.

FIELD OF INVENTION

The present invention relates generally to foams using environmentally benign blowing agents, and processes of making the same. Particularly, the present invention relates to thermoplastic polymer foams using methyl formate-based blowing agents that produce stable foams, and processes of making the same. The thermoplastic polymer foams are particularly suitable for various packaging applications in the form of foam expanded beads or extruded sheets and the articles made therefrom, and for insulation applications such as insulation boards in building materials.

BACKGROUND OF THE INVENTION

Thermoplastic foams made from alkenyl aromatic polymers (e.g. polystyrene) or polyolefin polymers (e.g. polyethylene and polypropylene) have found extensive use, particularly as packaging and insulating materials. Such foams are commonly manufactured as expanded beads, extruded sheets, or extruded boards. The difference between the expanded and extruded foams is that the extruded foams in the form of continuous sheets or boards, are made in a single-step process; whereas, expanded foams, in the form of discrete, small-size pieces, are made in a multi-step process. Thus, the dimensions of expanded foam are much smaller than those of extruded foam. Furthermore, the expanded foams do not necessarily have to be in the form of beads or peanuts, but can also be made from pellets, rods, platelets, thin sheet or film. For the sake of convenience, the term "bead" or "pellets" will be used throughout this application to imply other shapes in which small, discrete particles of the polymer resin can be used to make expanded foams.

Generally, alkenyl aromatic polymer foams in the form of beads or sheets having a thickness of less than about one-half inch are used to make packaging materials such as containers (e.g. cups, bowls, clamshells, picnic chests) for hot or cold beverages or food, and for protection during transportation of delicate or shock sensitive articles whereby the beads are fused or the sheet is thermoformed in a mold to give the packaging material of a desired shape. The foam beads are also used as loose fill dunnage material. Generally, insulating foams are produced in thickness greater than about one-half inch. The insulating value of such foams is measured in terms of heat conduction resistance or R-value, per one inch of foam thickness. Adequate insulating foams typically have R-values of about 4.0 or greater.

Packaging and insulation foam products with thickness greater than about 0.5 inch are called planks or boards. Such foam boards are produced in the desired shape and size by direct extrusion and cutting if needed, or by fusing the expanded foam beads. The foam boards can be used for protective packaging by die-cutting the boards to various shapes, for insulation, for dissipating mechanical energy as in automotive parts, or for cushioning floats. It is desirable that foams are dimensionally stable; this characteristic is even more desirable for planks or boards.

Polymer foams are commonly made using a continuous process where a blowing agent laden molten resin is extruded under pressure through an appropriate die into a lower pressure atmosphere. Alternatively, a batch or staged process can be used, where small polymer beads (also called particles or pellets) are impregnated with blowing agent and then heated rapidly to a temperature near or above the glass transition temperature of the polymer-blowing agent system, or subjected to an external compressive stress at a temperature up to the glass transition temperature of the polymer-blowing agent system.

In the past, physical blowing agents widely used for making foams were chlorofluorocarbons (CFCs) which, because of their high ozone depletion potential (ODP), were subsequently replaced with hydrochlorofluorocarbons (HCFCs) with ODP values much smaller than those of CFCs. Notwithstanding their reduced ODPs, the HCFCs are scheduled to be phased out by the year 2010 in the United States, and are increasingly being replaced with hydrofluorocarbons (HFCs), the latter having a) zero ODP, thereby minimizing damage to the ozone layer; and b) a thermal conductivity lower than most polymers or blowing agents, thereby lowering the foam's thermal conductivity.

Presently, physical blowing agents more commonly used for making thermoplastic polymer foams such as alkenyl aromatic polymer (e.g. polystyrene) or polyolefin polymer (e.g. polyethylene or polypropylene) foams are hydrocarbons, chlorinated hydrocarbons, HCFCs, HFCs, or combinations thereof. Hydrocarbons with three or more carbon atoms are considered volatile organic compounds (VOCs) that can lead to formation of smog. Furthermore, some halogenated hydrocarbons are either VOCs or have high ODP or are hazardous air pollutants (HAPs) and, at times, may fall into more than one of these categories. Therefore, the use of hydrocarbon and halogenated hydrocarbon blowing agents for preparing polymeric foams is not preferred environmentally and imposes many limitations on the manufacturing process, thus complicating and significantly increasing the cost of manufacturing. For example, alkenyl aromatic polymer (e.g. polystyrene) packaging foams (beads or sheets) are generally made using VOCs such as butanes or pentanes, and insulating foams are currently made using VOCs such as hydrocarbons and halogenated hydrocarbons or non-VOCs such as 1-chloro-1,1-difluoroethane (HCFC-142b), alone or in combination with ethyl chloride, which is classified both as a VOC and a HAP. It is therefore desirable to minimize or eliminate altogether the use of VOC and/or HAP compounds as blowing agents for preparing polymeric foams.

Methyl formate is classified as a non-VOC (Federal Register, Volume 69, Number 228, Nov. 29, 2004), is non-HAP, has zero ODP, and negligible global warming potential (GWP). U.S. Pat. No. 6,753,357 to Kalinowski, which is incorporated in its entirety herein by reference thereto, describes the use of methyl formate to produce stable, rigid isocyanate/polyol based polyurethane foams. It is noted, however, that such polyurethane foams are thermoset, so as to be made via a cross-linking and curing process. The dimensional stability or instability imparted to the final polyurethane foam product by the nature of the blowing agent therefore is quite different than in the case of thermoplastic polymer foams.

U.S. Pat. No. 3,914,191 to Scott, which is incorporated in its entirety herein by reference thereto, describes the use of a minimum boiling azeotropic mixture of 18 percent by weight (wt %) methyl formate and 82 wt % trichloromonofluoromethane (CFC-11). The stability of the foam is attributed to the minimum boiling characteristics of the azeotropic mixture, which generates a higher cell pressure—as opposed to a maximum boiling azeotropic or a non-azeotropic mixture—and, thereby, prevents cell collapse. Thus, Scott does not teach the use of compositions other than minimum boiling azeotropic compositions to make stable foams.

U.S. Pat. No. 3,900,433 to Taub, which is incorporated in its entirety herein by reference thereto, describes a styrene polymer bead impregnated with a blowing agent blend containing from about 0.5 to about 20 wt % of an impregnation aid. Particularly, Taub is discloses a blowing agent blend including dichlorofluoromethane and methyl formate as the impregnation aid. The methyl formate when present in an amount of 3 wt % of the blowing agent blend (corresponding to 0.084 wt % of the overall composition (polymer and blowing agent blend and additives)) was found to give free flowing beads. However, when the methyl formate is present in an amount of 6 wt % of the blowing agent blend (corresponding to 0.44 wt % methyl formate of the overall composition (polymer and blowing agent blend and additives), it resulted in beads that tended to fuse together.

U.S. Pat. No. 4,098,941 to Johnson, which is incorporated in its entirety herein by reference thereto, describes a process for quenching extrudate in boiling water to control expansion and form a density gradient from the core to the surface of the extrudate. Methyl formate is included in a list of possible volatile liquids that can be used in this process.

U.S. Pat. No. 4,104,440 to Collins, which is incorporated in its entirety herein by reference thereto, is directed to a melt extrusion process where the surface of the expanding foam is quenched to produce a substantially unfoamed "skin." Methyl formate is included in a list of possible volatile liquids that can be used in this process.

U.S. Pat. No. 5,532,284 to Bartlett, which is incorporated in its entirety herein by reference thereto, is directed to closed cell thermoplastic or thermoset polymer foam and process for manufacturing thereof, with a gas barrier resin substantially uniformly dispersed in the continuous polymeric phase which reduces the permeability of the foam, thereby maintaining a blowing agent in the cells of the foam. Methyl formate is included in a list of possible blowing agents.

U.S. Pat. No. 6,315,932 to Fujiwara, which is incorporated in its entirety herein by reference thereto, is directed to a melt extrusion process for producing polystyrene insulation boards, where the blowing agent mixture includes 5 to 40 wt % of dimethyl ether, diethyl ether and/or methyl ethyl ether, and 60 to 95 wt % of saturated $C_3$ to $C_5$ hydrocarbon. Optionally, additional blowing agents can be added to the blowing agent mixture, such as, fluorinated hydrocarbons, organic gases and carboxylic acid esters, such as methyl formate.

U.S. Pat. Nos. 6,569,912 and 6,762,212 to Oohara, which are incorporated in their entirety herein by reference thereto, are directed to an extruded polystyrene board obtained by a melt extrusion process, where the blowing agent mixture includes 10 to 100 wt % of a saturated $C_3$ to $C_5$ hydrocarbon and 0 to 90 wt % of a co-blowing agent. Methyl formate is included in a list of possible volatile liquids that can be used in this process. However, Oohara's patents further require specific combinations of flame retardants to be used in the process. The flame retardants, include, for example, a halogenated flame retardant and at least one compound including, phosphorus type flame retardants, tetrazole compounds, cyanuric acid, isocyanuric acid, metal borates and boron oxides.

Therefore, a need exists for blowing agent blends employing methyl formate and environmentally friendly co-blowing agents, preferably non-VOC and/or non-HAP co-blowing agents. A further need exists for efficient, cost-effective processes for producing dimensionally stable thermoplastic foams, without compromising the product quality or performance characteristics in terms of appearance, thermoformability, mechanical or compressive strength, resistance to flame-spread, and insulation value, utilizing blowing agent blends employing methyl formate in particular combinations and/or amounts that do not pose constraints on the thermodynamic state (i.e. azeotropic or not) of the blowing agent blend.

SUMMARY OF THE INVENTION

According to one embodiment of the present invention, a preferred blowing agent for making thermoplastic polymer foams is methyl formate. In accordance with a preferred embodiment, the blowing agent is a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. In a preferred embodiment, the co-blowing agent excludes a chlorofluorocarbon (CFC). In another preferred embodiment, the thermoplastic polymer foam structure is an alkenyl aromatic polymer foam structure. In a more preferred embodiment, the alkenyl aromatic polymer foam is an expanded polystyrene foam structure (also called EPS) or an extruded polystyrene foam structure (also called XPS), either of which can be used as packaging and insulation foams. In accordance with a preferred embodiment, the blowing agent is a blend including any combination of methyl formate and one or more co-blowing agents. For packaging foams, the preferred co-blowing agent is a hydrocarbon, more preferably a hydrocarbon containing two to five carbon atoms ($C_2$ to $C_5$ hydrocarbon), a halogenated hydrocarbon, an ether, an alkanol, a ketone, water, carbon dioxide, or any combination thereof For insulating foams, especially as planks or boards, the preferred co-blowing agent is a hydrocarbon, more preferably a hydrocarbon containing four or five carbon atoms, a halogenated hydrocarbon, an ether, an alkanol, a ketone, carbon dioxide, or any combination thereof. Generally, the foam sheets or beads have a thickness of less than about 0.5 inch; and the insulating foam boards have a thickness of at least about 0.5 inch, preferably about 0.5 inch to about 4 inch, and have R-values of about 4.0 per inch or greater.

According to another embodiment, an expandable polymeric formulation is used to prepare an expanded thermoplastic polymer foam structure. The formulation includes a thermoplastic polymer and a blowing agent, the blowing agent including methyl formate. The blowing agent can be a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. In a preferred embodiment, the co-blowing agent is other than a CFC. In another preferred embodiment, the thermoplastic polymer foam structure is an alkenyl aromatic polymer foam structure. In a more preferred embodiment, the alkenyl aromatic polymer foam is an expanded polystyrene foam structure (EPS). The blowing agent of the preferred embodiment includes 100% methyl formate, or the blowing agent can be a blend including any combination of methyl formate and one or more co-blowing agents. For packaging foams, the preferred co-blowing agent is a hydrocarbon, more preferably a hydrocarbon containing two to five carbon atoms, a halogenated hydrocarbon, an ether, an alkanol, a ketone, carbon dioxide, or any combination thereof, and for insulating foams, especially as planks or boards, the preferred co-blowing agent is a hydrocarbon, more preferably a hydrocarbon containing four or five carbon atoms, a halogenated hydrocarbon, an ether, an alkanol, a ketone, water, carbon dioxide, or any combination thereof. In a preferred embodiment, the formulation is in the to form of expandable beads.

According to another embodiment, a thermoplastic polymer foam structure is prepared by melting a thermoplastic polymer, mixing (e.g. dissolving, impregnating or entrapping) an effective amount of blowing agent, and extruding the compressed mixture through an appropriate die into a low pressure zone to form a foam sheet or a board, or into a low temperature zone to form expandable beads. In another aspect of this embodiment, the expandable beads are prepared by dissolving an effective amount of blowing agent into the thermoplastic polymer. In a further aspect, the expandable beads are prepared by synthesizing the polymer in the presence of the blowing agent so as to dissolve, impregnate or entrap the blowing agent in the polymer. The polymer can be in the form of pellets, preferably about 0.05 inch×0.05 inch in size, beads or particles. The expanded foam structure is then obtained by rapidly heating the expandable beads to a temperature near or above the glass transition temperature of the polymer-blowing agent system, to form foamed beads, which can be used as such or further compression molded into desired shapes and thickness. In another aspect, the expanded foam structure is obtained by subjecting the beads to an external compressive stress at a temperature up to the glass transition temperature of the polymer-blowing agent system. In one aspect of the invention, the components of the blowing agent blend are pre-mixed prior to dissolving the blend in the polymer. A preferred blowing agent for making the thermoplastic polymer foam structure is methyl formate. The blowing agent can be a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. In a preferred embodiment, the co-blowing agent is other than a CFC. In another preferred embodiment, the thermoplastic polymer foam structure is an alkenyl aromatic polymer foam structure. In a more preferred embodiment, the alkenyl aromatic polymer foam is an expanded polystyrene foam structure (EPS) or an extruded polystyrene foam structure (XPS), either of which can be used as packaging and insulation foams. The blowing agent of the preferred embodiment includes 100% methyl formate, or the blowing agent can be a blend further including any combination of methyl formate and one or more co-blowing agents. For packaging foams, the preferred co-blowing agent is a hydrocarbon, more preferably a hydrocarbon containing two to five carbon atoms, a halogenated hydrocarbon, an ether, an alkanol, a ketone, water, carbon dioxide, or any combination thereof. For insulating foams, especially as planks or boards, the preferred co-blowing agent is a hydrocarbon, more preferably a hydrocarbon containing four or five carbon atoms, a halogenated hydrocarbon, an ether, an alkanol, a ketone, carbon dioxide, or any combination thereof. Generally, the foam sheets or beads have a thickness of less than about 0.5 inch; the insulating foam boards have a thickness of at least about 0.5 inch, preferably about 0.5 inch to about 4 inch, and have R-values of about 4.0 per inch or greater.

According to a process of the present invention, a thermoplastic polymer foam structure is prepared by melting a thermoplastic polymer, mixing (e.g. dissolving, impregnating or entrapping) an effective amount of blowing agent, and extruding the compressed mixture through an appropriate die into a low pressure zone to form a foam sheet or a board, or into a low temperature zone to form expandable beads. In another aspect of this embodiment, the expandable beads are prepared by dissolving an effective amount of blowing agent into the thermoplastic polymer. In a further aspect, the expandable beads are prepared by synthesizing the polymer in the presence of the blowing agent so as to dissolve, impregnate or entrap the blowing agent in the polymer. The polymer can be in the form of pellets, preferably about 0.05 inch×0.05 inch in size, beads or particles. The expanded foam structure is then obtained by rapidly heating the expandable beads to a temperature near or above the glass transition temperature of the polymer-blowing agent system, to form foamed beads, which can be used as such or further compression molded into desired shapes and thickness. In another aspect, the expanded foam structure is obtained by subjecting the beads to an external compressive stress at a temperature up to the glass transition temperature of the polymer-blowing agent system. In one aspect of the invention, the components of the blowing agent blend are pre-mixed prior to dissolving the blend in the polymer. A preferred blowing agent for making the thermoplastic polymer foam structure is methyl formate. The blowing agent can be a blend further including at least one co-blowing agent. The co-blowing agent is either a physical co-blowing agent (e.g. an inorganic agent, a hydrocarbon, a halogenated hydrocarbon, an ether, an ester, an acetal, an alkanol, a carbonate, an amine, a ketone, or any combination thereof), a chemical co-blowing agent, or combinations thereof. In a preferred embodiment, the co-blowing agent is other than a CFC. In another preferred embodiment, the thermoplastic polymer foam structure is an alkenyl aromatic polymer foam structure. In a more preferred embodiment, the alkenyl aromatic polymer foam is an expanded polystyrene foam structure (EPS) or an extruded polystyrene foam structure (XPS), either of which can be used as packaging and insulation foams. The blowing agent of the preferred embodiment includes 100% methyl formate, or the blowing agent can be a blend further including any combination of methyl formate and one or more co-blowing agents. For packaging foams, the preferred co-blowing agent is a hydrocarbon, more preferably a hydrocarbon containing two to five carbon atoms, a halogenated hydrocarbon, an ether, an alkanol, a ketone, carbon dioxide, or any combination thereof. For insulating foams, especially as planks or boards, the preferred co-blowing agent is a hydrocarbon, more preferably a hydrocarbon containing four or five carbon atoms, a halogenated hydrocarbon, an ether, an alkanol, a ketone, carbon dioxide, or any combination thereof. Generally, the foam sheets or beads have a thickness of less than about 0.5 inch; the insulating foam boards have a thickness of at least about 0.5 inch, preferably about 0.5 inch to about 4 inch, and have R-values of about 4.0 per inch or greater.

The polymer foam structure obtained by the process of the present invention preferably is a substantially closed-cell and dimensionally-stable structure. In a preferred embodiment, the alkenyl aromatic foam structure includes a polystyrene polymer.

The inventive formulations and methods of the present invention employ blowing agents containing environmentally friendly non-VOC and non-HAP species, and thus offer significant advantages as compared with presently used blowing agents. The inventive blowing agent blends of the present invention also produce foams with improved resistance to flame spread, thereby offering additional advantages as compared to presently used blowing agents.

BRIEF DESCRIPTION OF THE DRAWINGS

FIG. 5 is a table of the test results and characteristics of the extruded alkenyl aromatic polymer foam sheets formed using the blowing agent blends according to one embodiment of the present invention.

FIG. 6 is a table of the test results and characteristics of the extruded alkenyl aromatic polymer foam sheets and resulting thermoformed parts formed using the blowing agent blends according to one embodiment of the present invention.

FIG. 7 is a table of the test results and characteristics of the extruded alkenyl aromatic polymer foam sheets and resulting thermoformed parts formed using the blowing agent blends according to another embodiment of the present invention.

FIG. 8 is a table of the test results and characteristics of the alkenyl aromatic polymer insulating foam planks or boards formed using the blowing agent blends according to one embodiment of the present invention.

FIG. 9 is a table of the test results and characteristics of the alkenyl aromatic polymer insulating foam planks or boards fanned using the blowing agent blends according to another embodiment of the present invention.

FIG. 10 is a table of the test results and characteristics of the alkenyl aromatic polymer insulating foam planks or boards formed using the blowing agent blends according to yet another embodiment of the present invention.

FIG. 11 is a table of the test results of the flame-spread analysis in alkenyl aromatic polymer insulating foam planks or boards fainted using the blowing agent blends according to one embodiment of the present invention.

Figure 1:
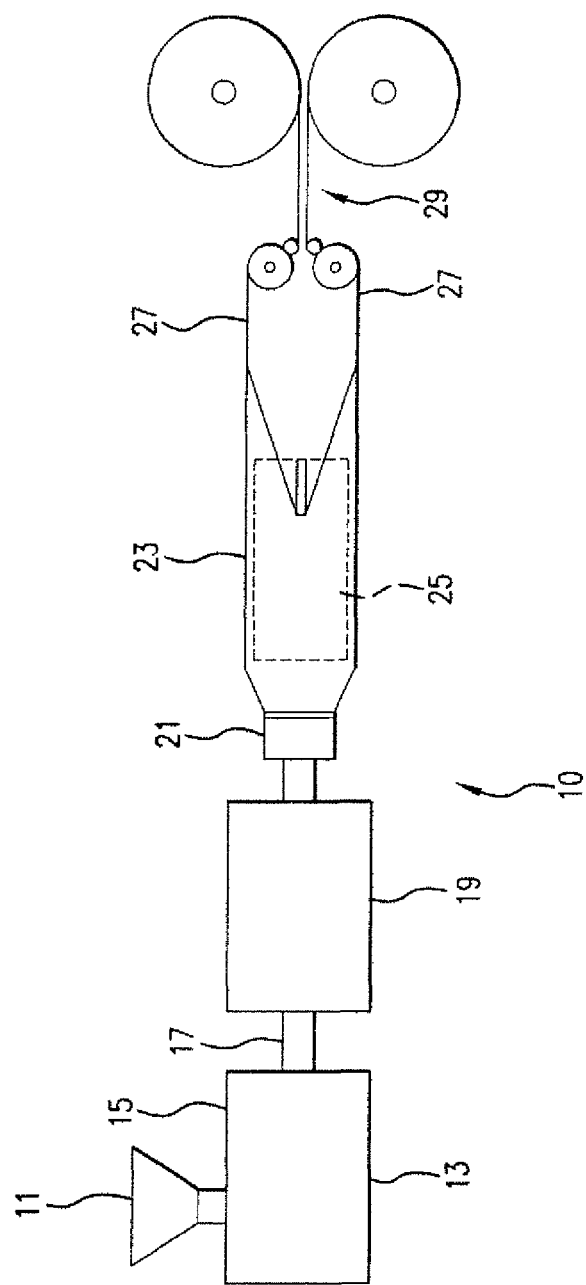
FIG. 1 is a schematic flow diagram of an overall sequence of operations involved in the manufacture of an extruded foam sheet according to one embodiment of the present invention.

While the invention is capable of various modifications and alternative forms, specific embodiments thereof have been shown by way of example in the drawing and will herein be described in detail. It should be understood, however, that it is not intended to limit the invention to the particular forms disclosed but, on the contrary, the intention is to cover all modifications, equivalents, and alternatives falling within the spirit and scope of the invention as defined by the appended claims.

DESCRIPTION OF ILLUSTRATIVE EMBODIMENTS

Reference will now be made in detail to the present preferred embodiments of the invention, an example of which is illustrated in the accompanying drawings. The method and corresponding steps of the invention will be described in conjunction with the detailed description of the compositions.

The methods and compositions presented herein may be used for the manufacture of foam beads, sheets, boards or planks. The present invention is particularly suited for a blowing agent composition having reduced ozone depletion potential, negligible global warming potential, and reduced or no smog formation potential.

In accordance with the present invention, dimensionally stable thermoplastic foams are achieved using blowing agents that are environmentally benign. The preferred blowing agent used in the present invention includes methyl formate, which is non-VOC and non-HAP, has zero ODP, and negligible GWP. Hence, eliminating HAPs and minimizing the propensity to smog formation or ozone depletion or global warming from the manufacturing process and the foam resulting therefrom is not only environmentally friendly, but also avoids many of the disadvantages of currently employed blowing agent compositions and processes. Thus, methyl formate, preferably, in combination with one or more suitable blowing agents having similar environmental attributes and, additionally, low thermal conductivity, can help offset the harmful environmental impacts (ODP, HAP, VOC, GWP) associated with the blowing agents in current use.

The effectiveness of a blowing agent depends on its solubility in the polymer and its ability to expand the polymer-blowing agent solution when such a solution is subjected to thermodynamic instability such as, for example, when the solution exits a die attached to an extruder (to provide the extrudate) or when the blowing agent laden polymer is rapidly heated. The expansion or expandability of the extrudate depends largely on the difference between the glass transition temperature of the thermoplastic polymer $T_g$ and the boiling point of the blowing agent $T_b$. In general, the solubility of the blowing agent in the polymer depends on the difference between $T_g$ and $T_b$ ($T_g-T_b$); the smaller the difference the higher the solubility. In the case of semi-crystalline polymers, the characteristic temperature governing expandability is the crystal melting temperature $T_m$, and that governing blowing agent solubility is ($T_m-T_b$). Since volatility follows an inverse relationship with $T_b$, it is understood that at the same conditions of temperature and pressure, a higher volatility blowing agent will have lower solubility compared to a lower volatility blowing agent. As such, by blending a lower volatility blowing agent with a higher volatility blowing agent, a foaming formulation with optimized solubility and expandability characteristics can be developed. Furthermore, by replacing a currently used VOC or HAP blowing agent with a non-VOC and non-HAP blowing agent of similar volatility, the emissions can be reduced without sacrificing the solubility and expandability characteristics. In fact, in accordance with a preferred embodiment of the invention, the foams produced using the blowing agent blends of the present invention do not require a gas barrier resin continuous in the polymeric phase to reduce the permeability of the foam and maintain the blowing agent in the cells of the foam.

In accordance with a further aspect of the present invention, foams produced by using the blowing agents of the present invention exhibit improved resistance to flame spread. In this regard, the methyl formate based blowing agents are used to modulate the burn rate of the foams. Accordingly, the foams of the present invention have improved flame resistance. It has been found that the use of methyl formate either alone or as a co-blowing agent imparts a remarkable resistance to flame spread.

In accordance with yet another aspect of the present invention, combinations of methyl formate and particular blowing agents have been shown to produce a dimensionally stable alkenyl aromatic polymer foam structure. For packaging foams, the preferred blowing agent blends are methyl formate and a co-blowing agent, preferably including hydrocarbons containing two to five carbon atoms ($C_2$ to $C_5$ hydrocarbons), a halogenated hydrocarbon, an ether, an alkanol, a ketone, water, carbon dioxide or any combination thereof. More preferably, the preferred co-blowing agents include hydrocarbons containing two to five carbon atoms, aliphatic alcohols containing one to four carbon atoms ($C_1$ to $C_4$ aliphatic alcohols), acetone, dimethyl ether, 1,1-difluoroethane (HFC-152a), 1,1,1,2-tetrafluoroethane (HFC-134a), 1,1,1,3,3-pentafluoroproparte (HFC-245fa), carbon dioxide, water, or any combination thereof. For insulating foams, especially as planks or boards, the preferred blowing agent blends are methyl formate and a co-blowing agent, preferably including hydrocarbons containing four or five carbon atoms, aliphatic alcohols containing one to four carbon atoms, acetone, dimethyl ether, carbon dioxide, 1,1-difluoroethane (HFC-152a), trans-1,2-dichloroethylene, 1,1,1,2-tetrafluoroethane (HFC-134a), 1,1,1,3,3-pentafluoropropane (HFC-245fa), 1-chloro-1,1-difluoroethane (HCFC-142b), or any combination thereof. For expandable bead formulations, the preferred blowing agent blends include methyl formate and co-blowing agents including hydrocarbons containing four to six carbon atoms, aliphatic alcohols containing one to four carbon atoms, acetone, dimethyl ether, carbon dioxide, water, trans-1,2-dichloroethylene, and 1,1,1,3,3-pentafluoropropane (HFC-245fa).

In accordance with a preferred embodiment of the invention, the dimensionally stable foam structure has an absolute percent gauge change less than about 15 percent after aging up to 7 days. Dimensional stability is usually expressed in terms of % density or gauge change, which is defined herein as 100×(aged gauge—initial gauge)/initial gauge, with initial gauge determined within 15 minutes of foaming. The resulting foam of the present invention is desirably "dimensionally stable" in that the gauge of the foam after 7 days of aging does not change by more than about 15%, preferably not more than 10%, and more preferably not more than 5% from the gauge of the freshly extruded foam. Preferably, the foams of the invention have a dimensional change of less than about 4%, more preferably less than about 1% in any direction.

Typically, foams made with blowing agents with Tb higher than the ambient temperature produce dimensionally unstable foams because of condensation of the higher Tb blowing agent inside the cells as the foam cools down to the ambient temperature. The boiling point of methyl formate is 32° C. whereas the ambient temperature usually is about 22° C. or lower. Therefore, dimensionally unstable foams will be expected to result from formulations using blowing agent blends that contain relatively higher fraction of methyl formate and/or formulations that use higher amounts of the blowing agent blend. Unexpectedly it has been found that dimensionally stable alkenyl aromatic polymer foam structures can be produced with relatively high amounts of methyl formate in the blowing agent blend. For example, methyl formate can be present in an amount greater than 35 wt %, or more preferably in an amount greater than 50 or 65 wt %, and produce a dimensionally stable alkenyl aromatic polymer foam. However, when methyl formate is present in an amount less than 35 wt %, the co-blowing agent does not include an ether.

Another unexpected and significantly advantageous aspect of the present invention is that the blowing agent composition does not have to be a minimum boiling azeotropic composition to make dimensionally stable foams—in fact, the blend composition can be varied over a large range to produce dimensionally stable foams.

In accordance with one embodiment of the invention, the blowing agent can include methyl formate alone or in combination with at least one co-blowing agent. For alkenyl aromatic polymer foams, it is preferred that the blowing agent blend include methyl formate and at least one co-blowing agent to form a dimensionally stable alkenyl aromatic polymer foam structure. In accordance with a preferred embodiment, methyl formate is present in the blowing agent composition in an amount of about 5 to about 90 wt %, more preferably, in an amount from about 5 wt % to about 85 wt %.

The blowing agent blend generally includes from about 1 wt % to about 99 wt % methyl formate, for example from about 5 wt % to about 75 or 85 wt % methyl formate, or from about 20 wt % to about 85 wt % methyl formate. The blowing agent blend more typically includes from about 20 or 25 wt % to about 60 or 65 wt % methyl formate. More specifically, the blowing agent blend preferably includes from about 35 wt % to about 50 wt % methyl formate.

If provided, the blowing agent blend generally includes at least about 1 to 20 wt % of co-blowing agent(s). The blowing agent blend more typically includes from about 80 or 75 wt % to about 40 wt % of co-blowing agent(s). More specifically, the blowing agent blend preferably includes from about 65 wt % to about 50 wt % of co-blowing agent(s). In accordance with a preferred embodiment of the invention, the blowing agent blend includes from 15 to 95 wt % of a co-blowing agent.

For example, and in accordance with a preferred embodiment of the present invention, the blowing agent blend includes from about 30 wt % to about 50 wt % methyl formate, and from about 70 wt % to about 50 wt % co-blowing agent. In accordance with yet another embodiment, the blowing agent blend includes from about 5 wt % to about 85 wt % of methyl formate and from about 15 to about 95 weight percent of at least one co-blowing agent, the co-blowing agents being selected to produce a dimensionally stable alkenyl aromatic polymer foam structure.

Resins that can be foamed in accordance with the present invention include melt processable thermoplastic polymers such as alkenyl aromatic polymers, polyolefins, polycarbonates, polyacrylates, and others. The term thermoplastic polymer includes both petroleum-based and biomass-based amorphous and semi-crystalline polymers. Examples of amorphous thermoplastic polymers include but are not limited to polystyrene, polycarbonate, poly(methyl methacrylate), and poly(phenylene oxide). Examples of semi-crystalline thermoplastic polymers include but are not limited to polyethylene, polypropylene, syndiotactic-polystyrene, and polyethylene terephthalate).

In a preferred embodiment of the present invention, the polymer includes an alkenyl aromatic polymer. The term "alkenyl aromatic polymer" as used herein, includes polymers of aromatic hydrocarbon molecules that contain an aryl group joined to an olefinic group with only double bonds in the linear structure, such as styrene, or styrene homologs such as α-methylstyrene, o-, m- and p-methylstyrene, α-ethylstyrene, o-, m-, p-ethylstyrene, 2,4-dimethylstyrene, α-vinylxylene, vinyl toluene and the like. Alkenyl aromatic polymers also include homopolymers of styrene or styrene homologs (commonly referred to as polystyrene), copolymers of styrene, and rubber-toughened polystyrene (commonly referred to as high impact polystyrene, HIPS). With respect to a styrene copolymer, the comonomer generally can be any other ethylenically unsaturated material such as the conjugated 1,3-dienes, e.g. butadiene, isoprene, etc., alpha-beta-unsaturated monocarboxylic acids and derivatives thereof, e.g. acrylic acid, methyl acrylate, ethyl acrylate, butyl acrylate, 2-ethylhexyl acrylate, and the corresponding esters of methacrylic acid, acrylamide, methacrylamide, acrylonitrile, methacrylonitrile, etc. If desired, blends of a styrene polymer with other polymers can be employed, e.g. blends of a styrene polymer with syndiotactic polystyrene or polyphenylene oxide. Preferably, the copolymers contain a predominant portion of styrene, for example greater than about 50 wt % styrene, and more preferably greater than 75 wt % styrene.

The at least one co-blowing agent can be a physical or a chemical co-blowing agent or combinations thereof. Further, the at least one co-blowing agent can be an organic compound or an inorganic compound. In a preferred embodiment, the at least one co-blowing agent is a non-VOC or a non-HAP, most preferably, the at least one co-blowing agent is both a non-VOC and a non-HAP.

In one embodiment, the at least one co-blowing agent generally is either fast expanding or has similar expansion characteristics as compared to pure methyl formate. In accordance with one aspect of the invention, suitable physical co-blowing agents include, but are not limited to, inorganic agents, organic agents (e.g. hydrocarbons, halogenated hydrocarbons, ethers, esters, acetals, alkanols, carbonates, amines and ketones), or any combination thereof.

For the purpose of illustration and not limitation, suitable inorganic physical blowing agents include carbon dioxide, water, air, nitrogen, argon, xenon, sulfur hexafluoride, nitrous oxide, ammonia, silicon tetrafluoride, nitrogen trifluoride, boron trifluoride, and boron trichloride, or any combination thereof. In one currently preferred embodiment, the inorganic agent is an inorganic gas such as carbon dioxide, nitrogen, argon, air and the like. A currently preferred inorganic gas is carbon dioxide. In another currently preferred embodiment, the inorganic agent is water.

For the purpose of illustration and not limitation, suitable organic physical co-blowing agents include hydrocarbons, halogenated saturated- or unsaturated-hydrocarbons, fluids with polar groups such as ethers, esters, acetals, carbonates, alkanols, amines and ketones, and combinations thereof. Examples of hydrocarbons include, but are not limited to, methane, ethane, propane, cyclopropane, normal- or iso-butane, cyclobutane, neopentane, normal- or iso-pentane, cyclopentane, hexane and its isomers, cyclohexane or any combination thereof. Examples of currently preferred halogenated saturated hydrocarbons include, but are not limited to, methyl fluoride, methylene chloride, difluoromethane (HFC-32), trifluoromethane (HFC-23), perfluoromethane, chlorodifluoromethane (HCFC-22), ethyl chloride, ethyl fluoride, 1,2-difluoroethane (HFC-152), 1,1-difluoroethane (HFC-152a), 1,1,1-trifluoroethane (HFC-143a), 1,1,2,2-tetrafluoroethane (HFC-134), 1,1,1,2-tetrafluoroethane (HFC-134a), pentafluoroethane (HFC-125), perfluoroethane, 1,1-dichloro-1-fluoroethane (HCFC-141b), 1-chloro-1,1-difluoroethane (HCFC-142b), 1,1-dichloro-2,2,2-trifluoroethane (HCFC-123), and 1-chloro-1,2,2,2-tetrafluoroethane (HCFC-124), isopropyl chloride, difluoropropane, 1,1,1-trifluoropropane, 1,1,1,3,3-pentafluoropropane (HFC-245fa), 1,1,1,2,3,3-hexafluoropropane (HFC-236ea), 1,1,1,2,3,3,3-heptafluoropropane (HFC-227ea), perfluoropropane, 2,2,4,4,4-pentafluorobutane (HFC-365mfc), perfluorobutane, perfluorocyclobutane, and vinyl fluoride, or any combination thereof. Examples of currently preferred halogenated unsaturated hydrocarbons include, but are not limited to, trans-1,2-diehloroethylene, 1,1,1,2-tetrafluoropropene (HFO-1234yf), and 1,1,1,2,3-pentafluoropropene (HFO-1225yez). Fluids with polar groups include but are not limited to ethers such as dimethyl ether, vinyl methyl ether, methyl ethyl ether, dimethyl fluoroether, diethyl fluoroether, and perfluorotetrahydrofuran; amines such as dimethylamine, trimethylamine and ethylamine; ketones such as acetone and perfluoroacetone; esters such as ethyl formate and methyl acetate; acetals such as methylal; carbonates such as dimethyl carbonate; alkanols such as methanol, ethanol, propanol and isopropanol, and butanol and isobutanol, or any combination thereof. Currently preferred organic physical co-blowing agents are hydrocarbons containing two to five carbon atoms, aliphatic alcohols containing one to four carbon atoms, dimethyl ether, acetone, HFC-152a, HCFC-142b, HFC-134a, and HFC-245fa. In one preferred embodiment, the co-blowing agent does not include a CFC, e.g. trichlorofluoromethane (CFC-11).

For the purpose of illustration and not limitation, suitable chemical co-blowing agents include azodicarbonamide, azodiisobutyronitrile, benzenesulfonylhydrazide, 4,4"-oxybis (benzene sulfonylhydrazide), p-toluene sulfonyl semicarbazide, barium azodicarboxylate, N,N'-dimethyl-N,N'-dinitrosoterephthalamide, trihydrazino triazine, and other azo, N-nitroso, carbonate, and sulfonyl hydrazides. The term "chemical co-blowing agents" as used herein refers to compounds which undergo a chemical reaction, for example decomposition, to produce an inorganic gas such as $CO_2$ or $N_2$ and CO. There are also various acid/bicarbonate mixtures that decompose into gases when heated. For example, mixtures of citric acid and sodium bicarbonate sold under the name HYDROCEROL® can be employed as chemical co-blowing agents.

As discussed above and in accordance with the present invention, the co-blowing agents are selected in combination with methyl formate such that the resulting polymer foam is dimensionally stable.

The terms "azeotrope" and "azeotropic mixture," used herein interchangeably, refer to a liquid mixture of two or more substances that retains the same composition in the vapor state as in the liquid state when distilled or partially evaporated under a certain pressure. An azeotrope can be a "minimum boiling azeotrope" where the boiling temperature of the azeotrope is less than that of the pure components, or a "maximum boiling azeotrope," where the boiling temperature of the azeotrope is higher than that of the pure components. Normally, the azeotropic state exists only at one specific composition. In accordance with one embodiment of the invention, the blowing agent blend can be either a minimum or maximum boiling azeotropic mixture or a non-azeotropic mixture regardless of whether the components of the blend are injected separately or pre-mixed and then injected. In accordance with a preferred embodiment of the invention, the blowing agent composition is not a minimum boiling azeotropic mixture.

The composition of the blowing agent blend depends on the foamed structure being prepared. When the foamed structure is an expandable bead, a sheet, a board or plank, the blowing agent blend includes a specific ratio of methyl formate and at least one co-blowing agent. In accordance with a preferred embodiment of the invention, the blowing agent blend includes 5 to about 85 wt % of methyl formate and about 15 to about 95 wt % of at least one co-blowing agent.

The total amount of the blowing agent in the polymeric formulation used to prepare the thermoplastic polymer foam structures depends on conditions such as temperature and pressure under which the blowing agent is dissolved in the polymer, the chemical and thermophysical characteristics of the blowing agent being used, and the desired density and associated properties such as insulation value, weight to strength ratio, compressive strength, etc. of the foamed article. The expandable or foaming formulation is defined herein as including the blowing agent(s), polymer resin(s), and any additives. For a foam having a density of from about 1 to about 15 lb/ft$^3$, the formulation typically includes from about 20 to about 1 wt % of blowing agent.

In further accordance with the invention, a nucleating agent or combination of such agents can be employed in the polymeric foaming formulation for advantages such as its capability for regulating cell formation, morphology, and performance characteristics of the foamed article. The amount of nucleating agent used depends upon the desired cell size, the selected blowing agent blend, and the desired foam density, and performance characteristics of the foamed article. The nucleating agent is generally added in amounts from about 0.02 to about 2.0 wt % of the polymer resin formulation.

Some contemplated nucleating agents include inorganic materials (in small particulate form, preferably, with high aspect ratio (>20) and particle size in the micrometer to nanometer range), such as clay or nanoclay, talc, silica, and diatomaceous earth. For example, talc can be used from about 0.25 to about 2.0 wt % of the polymer formulation. Other examples of nucleating agents include organic nucleating agents that decompose or react at the elevated temperatures to evolve gases, such as carbon dioxide and/or nitrogen. One example is a combination of an alkali metal salt of a polycarboxylic acid with a carbonate or bicarbonate. Some examples of alkali metal salts of a polycarboxylic acid include, but are not limited to, the monosodium salt of 2,3-dihydroxy-butanedioic acid (commonly referred to as sodium hydrogen tartrate), the monopotassium salt of butanedioic acid (commonly referred to as potassium hydrogen succinate), the trisodium and tripotassium salts of 2-hydroxy-1,2,3-propanetricarboxylic acid (commonly referred to as sodium and potassium citrate, respectively), and the disodium salt of ethanedioic acid (commonly referred to as sodium oxalate), or polycarboxylic acid such as 2-hydroxy-1,2,3-propanetricarboxylic acid. Some examples of a carbonate or a bicarbonate include, but are not limited to, sodium carbonate, sodium bicarbonate, potassium carbonate, potassium bicarbonate, and calcium carbonate.

It is contemplated that mixtures of different nucleating agents can be added in the present invention. Some more desirable nucleating agents include talc, crystalline silica, and a stoichiometric mixture of citric acid and sodium bicarbonate (the stoichiometric mixture having a 1 to 100 percent concentration where the carrier is a suitable polymer). Talc can be added in a carrier or in a powder form.

If desired, a flame retardant can also be employed in the present invention. Non-limiting examples of flame retardants include bromine compounds, chloroparaffins and other chlorine compounds, antimony trioxide, and alumina trihydrates. However, the use of methyl formate in a blowing agent blend imparts a remarkable resistance to flame spread. Accordingly, the foams produced with the blowing agent blends of the present invention have improved flame resistance and do not usually require high levels of flame retardants. In fact, the foams produced with the blowing agent blends of the present invention do not typically require the use of phosphorus type flame retardants containing nitrogen atom in a molecule, tetrazole compounds, or cyanuric acids.

Further, if desired, fillers, colorants, light and heat stabilizers, anti-oxidants, acid scavengers, stability control agents, processing aids, extrusion aids and foaming additives can be used in making the foam.

Any of the variety of suitable extrusion system or other methods known in the art for dissolving blowing agent in polymers can be used in accordance with the present invention. One example of a suitable system and method includes, for example, a conventional two-extruder tandem system with each extruder having a single screw. Alternatively, a two-extruder tandem system in which the primary extruder is a twin screw, and the secondary extruder is a single screw can be used for extruding the foam article of the present invention. A single extruder with proper cooling can also be employed in the present invention.

According to one process of the present invention, thermoplastic polymer pellets (e.g. polystyrene) are admixed with a nucleating agent, such as talc. These materials are continuously fed into a hopper of an extruder. The feed mixture is conveyed forward by a screw within a barrel of the extruder as the components are mixed, compressed, heated, and converted to molten form. The conversion to molten form occurs prior to reaching an injection zone where the blowing agent is added. The blowing agent(s) of the present invention can be injected into the polymer formulation at a point where the polymer is in a melt state (i.e., beyond the feed zone). Each of the components of the blowing agent blend can be individually injected, either sequentially or simultaneously and in any order, into the polymer melt. Alternatively, the components of the blowing agent blend can be pre-mixed and the blend injected into the polymer melt. If a two-extruder tandem system is used, the blowing agent(s) can be injected either in the primary or the secondary extruder or some components of the formulation can be injected in the primary extruder and the remaining components in the secondary extruder.

After injecting the blowing agent, the various components in the extruder are continuously mixed to ensure a homogeneous solution of the polymer and the blowing agent. The molten solution is then conveyed into a cooling zone where additional homogenization takes place. After cooling, the solution is extruded into a holding zone maintained at a temperature and pressure that prevents or inhibits foaming of the solution. The holding zone has (a) an outlet die having an orifice opening into a zone of lower pressure such as atmospheric pressure, (b) means for closing the orifice without disturbing the foamable solution within the holding zone, and (c) opening means for allowing the foamable solution to be ejected from the holding zone. An example of a holding zone is described in U.S. Pat. No. 4,323,528, the contents of which are incorporated by reference herein. Regardless of whether a holding zone is used, the solution is then extruded through a die into a lower pressure zone, such as atmospheric pressure. On exit, the extrudate is either allowed to foam or is immediately quenched to low temperatures (e.g. by contacting the extrudate with a heat exchange fluid such as water) and the solidified extrudate is chopped into small beads that can be expanded into foam structure at a later time if desired.

Figure 2:
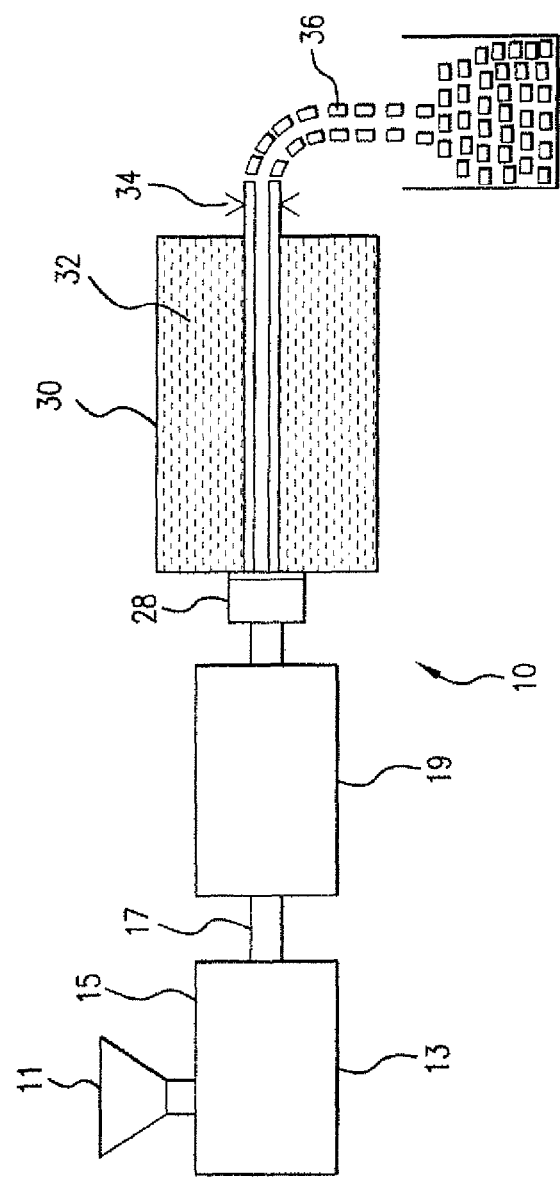
FIG. 2 is a schematic flow diagram of an overall sequence of operations involved in the manufacture of expandable beads according to one embodiment of the present invention.

According to one embodiment as applied to alkenyl aromatic polymers such as polystyrene, a two-extruder tandem system 10 can be used for extruding a foam article (e.g. a sheet) of the present invention as depicted in FIG. 1, or for making expandable beads as depicted in FIG. 2. Polymer resin pellets are mixed with one or more additives (e.g. a nucleating agent) to form a feed mixture which is fed continuously into a hopper 11 of a primary extruder 13. The feed mixture is conveyed forward by a helical screw within the barrel of the primary extruder as the feed components are mixed, compressed, heated, and melted prior to reaching the blowing agent-injection zone. The blowing agent is added at point 15. Thus, the blowing agent of the present invention is injected at a point beyond the feed zone where the polymer exists in the melt state. If desired, the blowing agent can be injected at other locations beyond the feed zone, including into the secondary extruder.

Following injection of the blowing agent, the components are continuously mixed in the primary extruder 13. The exit pressure of the primary extruder 13 of the exemplary embodiment is generally in the range of from about 1500 to about 4000 psi. The temperature of the primary extruder 13 of the exemplary embodiment is generally in the range of from about 390 to about 475° F. The mixture is subsequently passed, at a high enough pressure that the blowing agent remains in solution, through a hollow adapter section 17 into a cooled secondary tandem extruder 19. The molten mixture is passed along the length of the cooled secondary extruder at low shear where cooling and additional homogenization occur. The exit pressure of the secondary extruder 19 of the exemplary embodiment is generally in the range of from about 400 to about 2500 psi. The temperature of the extrudate from the secondary extruder 19 of the exemplary embodiment is generally in the range of from about 220 to about 320° F. In general, the temperature of the primary extruder should be sufficient to melt the polymer and any organic additives, and to promote efficient mixing and dissolution. The temperature and pressure in the secondary extruder should be sufficient to maintain a homogeneous solution of the components in the melt state. It is understood that the temperatures, pressures and other conditions described can vary depending on the properties of the thermoplastic polymer and blowing agent used in the process, and further that a third extruder in-tandem with the secondary extruder can be deployed to provide additional cooling. The specific conditions to be used are apparent to a person of skill in the art.

As seen in FIG. 1, for making foam sheet, the melt is then expressed through an annular die 21 and is allowed to undergo expansion under the ambient conditions of atmospheric pressure and room temperature in the form of an elongated bubble or tube 23, and the foamed polymer is drawn over a cylindrical surface of a cooling and sizing drum 25, and slit to form sheet stock 27, which is taken up on one or more winding reels 29. To further augment the mechanical, aesthetic, and other characteristics of the foam, the sheet thus made can be laminated with a film of solid, unfoamed polymer, where the polymer comprising the film can be the same polymer as that comprising the foam or a different polymer. The film can be applied by melt extruding the film-forming polymer or by heat-welding the film onto the sheet. The film can be applied on one or both surfaces, and can be applied either on-line to the sheet stock 27 before it is wound up as rolls 29 or by taking the roll 29 and applying the film in a separate process. The thickness of the film is generally from 1 to 25% of the thickness of the foam sheet, depending on the properties desired in the final product. The film can be comprised of a single layer or multiple layers and can contain nanoparticles such as, for example, nanoclays to further augment the aesthetics, mechanical properties, and gas-barrier properties of the film/foam structure. Such film/foam composite structures are different than the integral skin foam structures where a density gradient exists across the cross-section of the sheet and where the surface layers of the foam sheet have cellular structure, but a density different than that of foam in the core portion of the sheet.

Alternatively, as shown in FIG. 2, for making expandable polymeric beads, the melt is expressed through a strand or rod die 28 into a low temperature zone 30 containing a heat transfer fluid 32 such as water. In this manner, the molten solution solidifies into strands, usually about 0.05 inch in diameter, without undergoing any expansion or foaming. The continuous strands then go through chopper 34 or any other cutting apparatus, and are cut into pellets (typically 0.05 inch×0.05 inch) to form the so-called expandable beads 36. It should be noted that a die other than a strand or rod die can be used to make expandable formulation in shapes other than beads.

In another embodiment, instead of using the continuous melt process as described in FIG. 2, the expandable beads can be prepared with the blowing agent by exposing polymer pellets in the solid state to the blowing agent in a vessel for a time up to the solubility limit of the blowing agent in the polymer. This saturation step can be carried out at a slightly elevated temperature to accelerate the impregnation of the blowing agent into the solid pellets. However, the temperature should not be too high to allow the impregnated pellets to stick together. In yet another method, the impregnation of the blowing agent can be accomplished by performing the polymer synthesis in the presence of the blowing agent, so as to dissolve, impregnate or entrap the blowing agent in the polymer.

Figure 3:
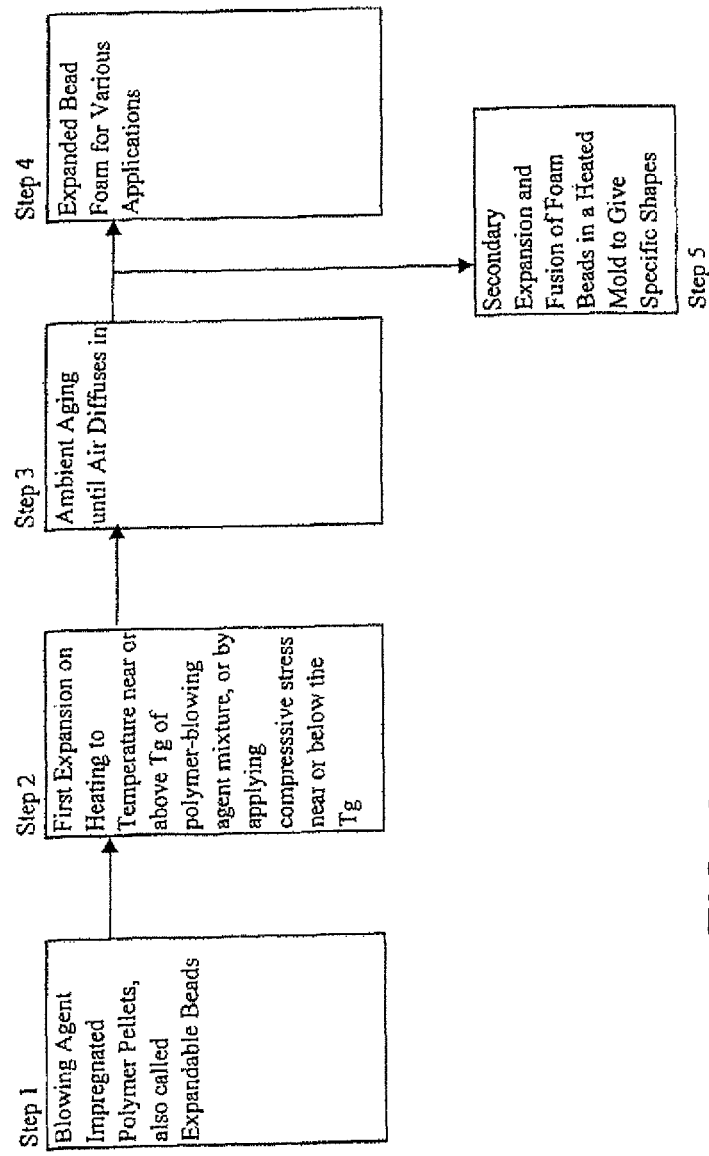
FIG. 3 is a schematic diagram of an overall sequence of operations involved in the manufacture of foam beads and articles made therefrom according to one embodiment of the present invention.

The expandable beads produced by any of the methods are then foamed as shown in FIG. 3, Step 2, by rapidly heating the beads to a temperature near or above the Tg of the polymer-blowing agent system, e.g. by contacting the impregnated pellets with a heat exchange fluid such as high heat-content steam or a hot salt bath. The impregnated pellets can also be foamed at temperatures below Tg of the neat polymer by applying mechanical pressure (compressive stress) to induce nucleation and growth of the cells as described in U.S. Pat. No. 6,080,798 to Handa, the contents of which are incorporated by reference herein. Regardless of the method used, the beads undergo rapid expansion to form foam beads (Step 2), which then undergo ambient aging (Step 3), for example by cooling the beads to ambient temperature, to allow air to diffuse into the foamed beads to stabilize the dimensions. These beads can be used as such, for example for loose fill packaging, as shown in Step 4. Alternatively, the expanded and aged beads can be fused together in a heated mold as shown in Step 5, to form products of any of a variety of different shapes such as cups, plates, molded packaging, containers, planks or boards. Further density reduction occurs during the molding operation with air and the residual blowing agent in the expanded bead providing further expansion. In yet another process, the expandable beads can be fed directly into a heated mold where they undergo foaming and fusion to give an article of desired shape.

Figure 4:
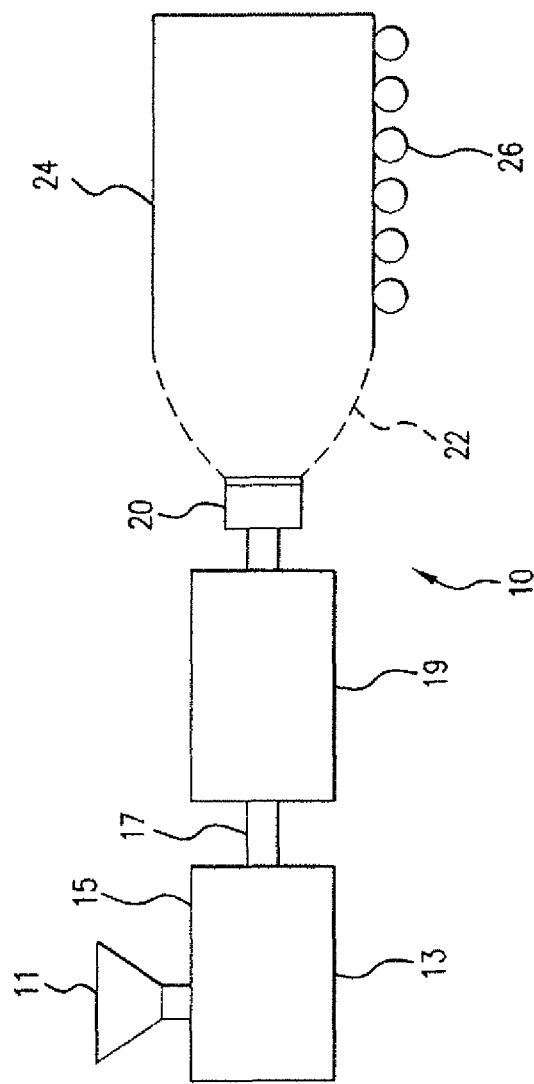
FIG. 4 is a schematic flow diagram of an overall sequence of operations involved in the manufacture of an extruded foam board or plank according to one embodiment of the present invention.

In yet another configuration, as shown in FIG. 4, the foamable formulation is expressed through a die of a different configuration such as a flat die 20 and allowed to expand in the form of a board or plank 24. The expanding extrudate 22 is moved forward by a set of rollers 26, and may be further directed to a shaping device before emerging as a board or plank 24.

Depending upon the materials and process used, the resulting foam article can be a bead, a sheet, a board, a plank, or the like. The foam beads can be further molded to form a sheet, plank or board, or into articles of various shapes, sizes, and thickness. If the article produced is a sheet, the thickness of the sheet can be up to about 0.5 inch. If the article produced is a plank or a board, the thickness is generally equal to or greater than about 0.5 inch, preferably between 0.5 inch and 4 inches.

For preparation of thermoplastic polymer foam sheets, the use of an annular die is preferred. The articles produced by extrusion through an annular die are generally less than about 0.5 inch in thickness, preferably from about 0.03 to about 0.5 inch, and more preferably from about 0.050 to 0.5 inch in thickness. Such foamed sheets are particularly useful as protective wrapping material and for thermoforming into various shapes such as fanfold sheets or containers for rigid packaging.

For preparation of thermoplastic polymer foam boards, e.g. insulation boards, the use of a flat die is preferred. The articles produced by extrusion through a flat die are generally at least about 0.5 inch in thickness. For example, and in a preferred embodiment, for insulating materials, the thickness is about 0.5 to about 4 inches. Such boards have particular utility as insulating materials, e.g. insulation boards or planks, protective cushioning, or flotation materials.

Regardless of the type of die used or the foam produced (bead, sheet, or board), the foam can be subjected to further expansion or density reduction by repeated cycles of aging (to allow air to diffuse into the cells and to re-establish the equilibrium between the blowing agent in the polymer phase and inside the cells) followed by application of heat and/or vacuum.

The foam beads, sheets and boards or planks can be used as such, cut into other shapes, further shaped or thermoformed by application of heat and pressure or vacuum, or otherwise machined or formed into shaped articles of desired size and shape as known in the art.

Depending upon the materials and process used, the resulting foamed article generally has a density from about 1 to about 15 lb/ft$^3$, with further density reduction achieved via successive expansion cycles of aging followed by application of heat and/or vacuum. The latter density reduction technique is typically used in foamed beads where densities substantially less than 1.0 lb/ft$^3$ are achieved. A foamed sheet typically has a density from about 2.0 to about 9.0 lb/ft$^3$, while a foamed board used for insulation purposes typically has a density of about 1.5 to about 3.5 lb/ft$^3$. In accordance with a preferred embodiment of the invention, the resulting foamed article or foamed structure has a substantially uniform density throughout. For example, the resulting foamed article or structure of the present invention preferably does not have a density gradient, as is typically created, for example, when quenching a foam sheet or board and/or chilling the foam surface to produce a skinned surface. Preferably, the foam is allowed to expand such that the density is substantially uniform through the foam structure.

Furthermore, and in accordance with one preferred embodiment of the invention, the resultant foamed article has a substantially closed-cell structure and is defined herein as a foam having greater than about 85% closed cells and, more typically, greater than about 95% closed cells. Alternatively, and in accordance with another aspect of the invention, the resultant foamed article can be formed with 15% or more open cells, for example 20%, 25%, 30% or more open cells. Furthermore, the resulting foam structure can be controlled to include at least about 25, 30, 35, 40, 45, 50 or more cells per inch for foam beads and sheets, and at least about 50, 55, 65, 75, 85, 95, 100 or more cells per inch for extruded boards.

The term "R-value" refers to a unit of thermal resistance used for comparing insulating values of different materials, as is known in the art. Generally, the higher the R-value the better the insulation characteristics. Many factors can affect the R-value of insulation, including the type of blowing agent used and the age of the foam. R-values are usually expressed in terms of a standard unit of thickness of the material. For example, R-values for foams can be measured per inch of foam thickness. Adequate insulating foams such as the foams of the present invention preferably have R-values of about 4.0 per inch or greater. For example, and in a preferred embodiment, the insulating foams of the present invention have R-values per inch of greater than about 5. The R value of the foams of the invention are determined by conventional methods, for example using ASTM C518.

The foams of the present invention can be used for insulation or as building materials, in various containers and packaging systems, or as protective or flexible packaging. In particular, the foam sheets of the present invention can be thermoformed into containers, such as for example, trays, bowls and plates. Generally, extruded foam sheets are used in flexible as well as rigid packaging; extruded foam planks are used in protective packaging; extruded foam boards having a thickness greater than about 0.5 inch are used for insulation applications, for example as building materials; and foam beads are used for loose fill packaging, or are molded as sheets or planks or boards or contoured articles for flexible, protective, rigid, and insulation applications. In addition to foam sheets, planks and boards, the present invention can take the form of other shapes such as rods, tubes or contoured members.

Other uses for the foams of the present invention, as well as suitable processes, apparatus, equipment, devices and systems for the preparation thereof are described in United States Patents and published Applications U.S. Pat. No. 6,136,875 to Wu; U.S. Pat. No. 5,149,473 to LeDuc; U.S. Pat. No. 6,476,080 to Duffy, U.S. Pat. No. 6,599,946 to Duffy, U.S. Pat. No. 6,696,504 to Hayashi, US 2004/0132844 to Francis; and US 2004/0006149 to Handa, the contents of each of which are incorporated by reference herein.

The following examples are presented in order to more fully illustrate certain embodiments of the invention. These examples in no way, however, should be construed as limiting the broad scope of the invention. One skilled in the art can readily devise many variations and modifications of the principles disclosed herein without departing from the scope of the invention.

EXAMPLES

Example A

Various blowing agents were tested with the results for the extruded foam sheets shown in FIG. 5. Specifically, various alkenyl aromatic polymer foam sheets useful for thermoforming applications were made from comparative blowing agents and inventive blowing agents in accordance with the extrusion process generally described herein. It should be noted that for the various examples reported in FIG. 5, each exemplary foam was made with the same polymer and the same hardware operated in exactly the same way; the only variable being the blowing agent. All of the inventive blowing agents included methyl formate; the comparative blowing agent(s) did not include methyl formate.

Each of the alkenyl aromatic polymer foams was made on a tandem extrusion line employing 2.5 inch and 3.5 inch single screw extruders and blowing agent was injected through a single port in the primary extruder. The output rate was about 150 lb/hr. The polymer resin used was high heat general purpose polystyrene having a density of 1.05 g/cm$^3$ and a melt flow rate of 1.6 g/10 min at 200° C. under a load of 5 kg. In addition to the blowing agents and the polystyrene resin, talc was added in the amount of up to 2 wt % of the total foaming formulation including all the blowing agent(s), polymer resin(s), and additives. An annular die with a diameter of 2.5 inches was used and the expanding extrudate was drawn over the cylindrical and cooled surface of a sizing drum with a circumference of 33 inches to form the foam sheet. An example of suitable equipment for preparing the alkenyl aromatic polymer foam sheets is described in U.S. Pat. No. 6,136,875 to Wu, the contents of which are incorporated by reference herein.

All of the above foams of FIG. 5 were dimensionally stable because after having undergone aging for 7 days no further significant change in the gauge was noticed. It is noted that all of the foams in FIG. 5, except for inventive example 2, showed post-extrusion growth. This unidirectional change is different from the conventionally used definition of dimensional stability whereby the foam can either shrink or expand with time. The formulations described herein provide stable foam structures produced by an environmentally friendly and cost-effective process. Furthermore, a variety of foams having suitable and desired characteristics can be formed in accordance with the present invention. For example, inventive formulation 3 contains the highest percentage of open cells, and is thus advantageous since the flammable properties of the foam are reduced as the percentage of open cells increases due to rapid loss of the flammable component(s) of blowing agent blend.

In another example, inventive formulations 2 to 5 include only non-VOC components with the least and negligible impact on air quality. Comparative examples 1 and 2 are typical formulations widely used in making polystyrene expanded beads and foam sheets, respectively. Other variants of the comparative formulation 2, again in wide use, are where isopentane is replaced with normal pentane or isobutane or normal butane. Inventive examples 6 to 14 demonstrate how foam sheet (and, by extension, expanded beads) with similar characteristics can be made using formulation where the use of the hydrocarbon VOC blowing agent is much reduced. A widely used blowing agent for making expanded beads is pentane, which has a boiling point of 36° C. and a heat of vaporization of 25.8 kJ/mol at the boiling point; the corresponding values for methyl formate are 32° C. and 27.9 kJ/mol, respectively. The combination of lower boiling point and higher heat of vaporization for methyl formate corresponds to higher volatility and thus gives better expansion than pentane. Consequently, partial or complete replacement of pentane with methyl formate leads to a significant reduction in VOC emissions during the expanded bead formation (FIG. 3, Step 2) and molding (FIG. 3, Step 5) operations, and from post-manufacturing operations such as foam or product storage.

Furthermore, it should be noted that the total number of moles of the blowing agent in all the formulations in FIG. 5 is the same (about 0.07 moles per 100 g of total material processed). The attainment of foams with different densities thus simply reflects the effective volatility of the blowing agent blend. It will be obvious to one skilled in the art that foams with lower densities can be obtained by changing the composition of the blowing agent blend and making it rich in the component(s) with higher volatility, and that the density can be further reduced by using more number of moles of the blowing agent. As noted in the footnote to FIG. 5, the cell sizes reported are not those of the foams as extruded but of the foams which had subsequently been expanded at 240° F. This was done to simulate the thermoforming operation whereby the foams undergo further expansion. Thus, the cell sizes of the foams as extruded were much smaller than those reported in FIG. 5. Each of the inventive formulations of FIG. 5 gives rise to a foam that is stable and easy to manufacture and handle.

Example B

Various blowing agents for use in making thermoformable polystyrene foam sheets were tested with the results for the extruded foam sheets and the thermoformed parts shown in FIG. 6. Specifically, various alkenyl aromatic polymer foam sheets useful for thermoforming applications were made from comparative blowing agent and inventive blowing agent blends, in accordance with the extrusion process generally described herein. The comparative blowing agent blend includes isopentane, a VOC blowing agent, in combination with the non-VOC co-blowing agent carbon dioxide; and the inventive blowing agent blends substitute methyl formate, a non-VOC and non-HAP blowing agent, for isopentane and, therefore, include isopentane, carbon dioxide and methyl formate. The polystyrene resin and the hardware used, and the output rates were the same as in Example A.

All of the foams of FIG. 6 were dimensionally stable. The total number of moles of the blowing agent in all the formulations in FIG. 6 is the same (about 0.08 moles per 100 g of total material processed). The attainment of foams with very similar densities simply reflects the fact that the boiling points of isopentane (28° C.) and methyl formate (32° C.) are quite close and thus the effective volatility of the blowing agent blend remains almost the same.

When the boiling point of a blowing agent is higher than the ambient temperature (usually regarded as 22° C. or lower), the foam becomes more prone to cell collapse because as the foam cools down to the ambient temperature the blowing agent inside the cell can condense thereby generating a negative pressure. The collapse is generally indicated by the extruded foam having a higher density, or its inability to thermoform without undergoing fracture or surface cracks or without any significant density reduction, or by the inability of the extruded sheet to wind into a roll with even edges. In this regard, as the inner layers in the roll collapse, the on-coming layers tend to slip such that the roll does not wind evenly, giving the edges of the roll a warped or telescopic look. Such collapsed foam rolls cause further difficulty not only during production and the subsequent thermoforming process—when the roll does not unwind properly—but also gives the finished parts a poor appearance and/or performance characteristics.

In the inventive blowing agent blends given in FIG. 6, both isopentane and methyl formate have boiling points higher than the ambient temperature. Accordingly, it was a surprising and an unexpected result that all of the inventive foams in FIG. 6 gave stable foams with densities actually lower than that obtained with the comparative formulation, even when a rather large fraction (up to 40 wt %) of isopentane was substituted with the higher boiling methyl formate. All of the inventive foam sheets in FIG. 6 were wound into rolls without any difficulty, were thermoformed into bowls, plates, meat trays, and five-compartment school lunch trays. These thermoformed products involve a diverse array of contoured surfaces and, therefore, provide a stringent test of the thermoformability attributes of the inventive foams. Indeed, all of the inventive foam sheets had similar thermoformability attributes as the comparative foam sheet. For example, the density of the thermoformed parts for the inventive foam sheet and the comparative foam sheet was about 40 to 65% of the density of the extruded foam. Similarly, the performance characteristics, for example, the flexural modulus and compressive strength of the parts thermoformed from the inventive foam sheet and the comparative foam sheet were about the same.

It should be noted that the cell sizes reported in FIG. 6 are not those of the foams as extruded but of the thermoformed foams. The cell sizes of the foams as extruded were much smaller than those reported in FIG. 6.

Example C

Various blowing agents for use in making thermoformable polystyrene foam sheets were tested with the results for the extruded foam sheets and thermoformed parts shown in FIG. 7. Specifically, various alkenyl aromatic polymer foam sheets useful for thermoforming applications were made from comparative blowing agent and inventive blowing agent blends, in accordance with the extrusion process generally described herein. The comparative blowing agent blend includes isobutane, a VOC blowing agent, in combination with the non-VOC co-blowing agent carbon dioxide; and the inventive blowing agent blends substitute methyl formate, a non-VOC and non-HAP blowing agent, for isobutane and, therefore, include isobutane, carbon dioxide and methyl formate. The polystyrene resin and the hardware used, and the output rates were the same as in Example A All of the foams of FIG. 7 were dimensionally stable. The total number of moles of the blowing agent in all the formulations in FIG. 7 is the same (about 0.06 moles per 100 g of total material processed). In inventive examples 5 and 6, the amount of carbon dioxide and talc used were adjusted to maintain the same cell size as obtained in inventive examples 1 to 4. The dimensional stability of the foams made from inventive examples 5 and 6 was the same as those made from inventive examples 1 to 4. All of the foam rolls made from the formulations in FIG. 7 wound without telescoping.

The comparative example used 100% isobutane, which is a highly effective blowing agent for polystyrene because of its low boiling point (about −12° C.), favorable solubility in the polymer, and low permeability through the foam. Thus, it was a surprising and an unexpected finding that stable foam sheets with similar or lower densities were obtained even at high rates of substitution of isobutane with methyl formate or (methyl formate+carbon dioxide). The amount of VOC in the inventive examples was reduced by as much as 80 wt %.

All the inventive foam sheets in FIG. 7 were wound into rolls without any difficulty, were thermoformed into bowls, plates, meat trays, and five-compartment school lunch trays. These then thermoformed products involve a diverse array of contoured surfaces and, therefore, provide a stringent test of the thermoformability attributes of the inventive foams. Indeed, all of the inventive foam sheets had similar thermoformability attributes as the comparative foam sheet. For example, the density of the thermoformed parts for the inventive foam sheet and the comparative foam sheet was about 40 to 65% of the density of the extruded foam. Similarly, the performance characteristics, for example, the flexural modulus and compressive strength were about the same for the inventive foam sheet and the comparative foam sheet. Additionally, the inventive parts had better aesthetics than the comparative parts in that the surface of the finished parts had a smoother and shiny appearance.

It should be noted that the cell sizes reported in FIG. 7 are not those of the foams as extruded but of the thermoformed foams. The cell sizes of the foams as extruded were much smaller than those reported in FIG. 7.

Example D

Various inventive blowing agent blends for use in forming insulating foam planks or boards were tested with the results shown in FIG. 8. Specifically, various alkenyl aromatic polymer foam boards useful for insulation applications were made from inventive blowing agent blends in accordance with the extrusion process generally described herein. It should be noted that for the various examples reported in FIG. 8, each exemplary foam board was made with the same hardware operated in exactly the same way; the only variable being the composition of the blowing agent blend and the relative percentages of the polystyrene polymer. All of the inventive blowing agent blends include methyl formate in combination with the co-blowing agents HFC-134a and $CO_2$ and thus constitute 100% non-VOC blowing agents.

Each of the alkenyl aromatic polymer foams was made on a tandem extrusion line employing 1.0" and 1.5" single-screw extruders equipped with three ports in the primary extruder for injecting compressed fluids. The output rate was about 10 lb/hr. The polymer samples used were high heat general purpose polystyrene having a melt flow rate of 1.6 (PS1), high heat general purpose polystyrene having a melt flow rate of 11 (PS2), and polystyrene reclaimed from Applicant's commercial insulation board process having a melt flow rate of 11.5 (PS3). Talc was added in the amount up to about 2.5% of the amount of virgin in polystyrene (PS1+PS2). A flat die was used and the expanding extrudate was directed to a shaping device to form foam boards with nominal dimensions of 5.0" (width)×0.5" (thickness). The adjustable shaping device used can be configured to create a preferential orientation of the cells in the normal direction, as seen in FIG. 8.

FIG. 8 provides various exemplary formulations used to prepare insulating foam boards from an extrudate including polystyrene, talc, methyl formate, HFC-134a and optionally $CO_2$, in accordance with the present invention. Additionally, FIG. 8 provides the melt temperature of each of the foaming formulations prior to extrusion. FIG. 8 also provides the density, R-value, and cell size of the corresponding board or plank formed from the various exemplary formulations.

All of the foam boards of FIG. 8 were dimensionally stable. The dimensions were measured within 15 minutes of extrusion and then after 14 and 28 days. The change in any given dimension was less than 1% and the overall change in density with respect to the fresh density was within 2%.

In accordance with another aspect of the present invention, and in addition to the benefits of using methyl formate as a blowing agent previously set forth, such as offsetting the undesired impact associated with blowing agents in current use, the use of methyl formate provides an additional advantage. Namely, methyl formate escapes the foam quite rapidly. About 12% of the methyl formate escaped the 0.5" thick board within the first 3 hours following extrusion, and none was detected after 30 days using a limit of detection of 500 ppm. Because methyl formate is the only flammable component of the blowing agent blends shown in FIG. 8, the foams made from such formulations have improved resistance to flame-spread. Ethane can be substituted for $CO_2$. Although ethane is flammable, it also escapes the foam matrix rapidly, again improving resistance to flame-spread.

Example E

Various blowing agents for use in forming insulating foam planks or boards were tested with the results shown in FIG. 9.

Specifically, various alkenyl aromatic polymer foam boards useful for insulation applications were made from comparative blowing agent and inventive blowing agent blends, in accordance with the extrusion process generally described herein. The comparative blowing agent blend includes ethyl chloride—a VOC and HAP blowing agent, in combination with the non-VOC co-blowing agent HCFC-142b, and the inventive blowing agent blend includes methyl formate, a non-VOC and non-HAP blowing agent, in combination with the non-VOC HCFC-142b, thus providing a 100% non-VOC blowing agent blend.

It should be noted that for the various examples reported in FIG. 9, each exemplary foam board was made with the same hardware operated in exactly the same way; the only variable being the composition of the blowing agent blend. The polystyrene resin and the hardware used, and the output rates were the same as in Example D. Talc was added in the amount of 2.0% of the amount of polystyrene (PS1+PS3). A flat die was used and the expanding extrudate was directed to a shaping device to form foam boards with nominal dimensions of 5.0" (width)×0.5" (thickness).

All of the foam boards of FIG. 9 were dimensionally stable. The dimensions were measured within 15 minutes of extrusion and then after 14 and 28 days. The change in any given dimension was less than 1% and the overall change in density with respect to the fresh density was within 2%.

The results presented in FIG. 9 demonstrate that the non-VOC methyl formate can replace hazardous blowing agents such as ethyl chloride, without sacrificing process efficiency and product characteristics, such as density, cell size and R-values.

The 100% non-VOC inventive blowing agent blends thus offer significant advantages as compared with presently used blowing agent blends.

Example F

Various blowing agents for use in forming insulating foam planks or boards were tested with the results shown in FIG. 10. Specifically, various alkenyl aromatic polymer foam boards useful for insulation applications were made from comparative blowing agent and inventive blowing agent blends, in accordance with the extrusion process generally described herein. The comparative blowing agent blend includes ethyl chloride—a VOC and HAP blowing agent, in combination with the non-VOC co-blowing agent HCFC-142b or HFC-134a, and the inventive blowing agent blend includes methyl formate, a non-VOC and non-HAP blowing agent, in combination with the non-VOC HCFC-142b or HFC-134a.

It should be noted that for the various examples reported in FIG. 10, each exemplary foam board was made with the same hardware operated in exactly the same way; the only variable being the composition of the blowing agent blend. Each of the alkenyl aromatic polymer foams was made on a production-scale tandem extrusion line employing 6" and 8" single-screw extruders equipped with a single port in the primary extruder for injecting compressed fluids. The output rate was 1700 lb/hr. The polystyrene resins used were the same as in Example D. A flat die was used and the expanding extrudate was directed to a shaping device to form foam boards with nominal dimensions of 36" to 48" (width)×1.0" (thickness).

All of the foam boards of FIG. 10 were dimensionally stable. The dimensions were measured within 30 minutes of extrusion and then after 37 days. The change in any given dimension was less than 1% and the overall change in density with respect to the fresh density was within 2%.

The results presented in FIG. 10 demonstrate that the non-VOC methyl formate can replace hazardous blowing agents such as ethyl chloride, without sacrificing process efficiency and product characteristics, such as dimensional stability, density, cell size and values.

The 100% non-VOC inventive blowing agent blends thus offer significant advantages as compared with presently used blowing agent blends. Though Examples A-F have been described in terms of extruded sheets, boards or planks, similar products can be made using expandable beads and the processes shown in FIGS. 2 and 3 without departing from the majority of the formulations shown in FIGS. 5 through 10 and the scope of the present invention.

Example G

A burn test was conducted to determine the flame-spread in insulating foam planks or boards made with various blowing agents, with the results shown in FIG. 11. Specifically, a flame-spread comparison was conducted on insulating foam planks or boards made from comparative blowing agent and inventive blowing agent blends.

The burn test was conducted using a Horizontal Flame Chamber (Atlas Material Testing Technology, LLC, Chicago, Ill.) equipped with a U-shaped metal frame and a burner. The test was conducted under ambient conditions of (70±10)° F. temperature and (50±10) % relative humidity. The test procedure consists of installing a 4 inch×12 inch foam board in the metal frame mounted horizontally in the flame chamber. A gas flame is held for 5 seconds underneath the foam sample at the open end of the frame. The direct flame contact causes about 1.5 inch of the foam sample to burn after which the flame either extinguishes by itself or spreads through the sample to a certain distance and then extinguishes by itself. The distance D (inches) to which the flame spreads in time t (seconds) is measured during the test. The flame-spread distance is measured 1.5 inch from the edge of the sample at the open end of the frame. The distance to which the flame spreads is marked by the dark coloration of the sample and, in cases of higher flammability, the appearance of a grooved surface because of loss of considerable amount of foam mass. The burn rate B, expressed in inch/min, is given by 60×(D/t).

The values of burn rate B are given in FIG. 11 and provide a relative ranking of flammability of the foam boards made with the various blowing agent formulations—the higher the B value or the burn rate, the higher the flame spread. As can be seen from the results presented in FIG. 11, the use of methyl formate as a blowing agent imparts a remarkable resistance to flame-spread. Sample 1 that contained methyl formate and HCFC-142b as the only blowing agents had almost zero burn rate whereas Sample 4 that did not contain methyl formate and contained isopentane and HFC-134a as the only blowing agents had the highest burn rate of about 90. Samples 2 and 3 that contained methyl formate with a C5-hydrocarbon and HFC-134a had burn rates of 7.6 and 29.8, respectively, indicating that methyl formate can be used to modulate the burn rate and R-value of foams. It has been found that the use of methyl formate either alone or as a co-blowing agent imparts a remarkable resistance to flame spread. Accordingly, the foams of the present invention have improved flame resistance.

The foregoing Examples demonstrate how methyl formate in suitable combinations and amounts with other co-blowing agents can provide a substantial reduction or complete elimination of the use of undesirable VOC and/or HAP blowing agents. Advantageously, such combinations provide foams varying from thin sheets to thick boards that are dimensionally stable, and provide finished parts with performance characteristics equivalent to those made from foams made with current blowing agents that often employ VOC and HAP species. Additionally, the inventive blowing agents do not affect the production rates, considerably improve the aesthetics of finished parts, and lend excellent resistance to flame spread. In addition to the several 100% non-VOC blowing agent blends disclosed herein, such blends can further contain a small amount of an alkanol, preferably a $C_1$ to $C_4$ aliphatic alcohol, or mixtures thereof. Though these alkanols are VOCs, they help solubilize highly volatile non-VOC components such as $CO_2$ or HFC-134a, and thus enable the use of higher amounts of the non-VOC constituents.

While the present invention has been described with reference to one or more particular embodiments, those skilled in the art will recognize that many changes can be made thereto without departing from the spirit and scope of the present invention. Each of these embodiments and obvious variations thereof is contemplated as falling within the spirit and scope of the claimed invention, which is set forth in the following claims.

What is claimed is:

1. A thermoplastic polymer foam article prepared by a process comprising:
   preparing an expandable polymeric formulation comprising a thermoplastic polymer and a blowing agent blend comprising methyl formate and ethane, the blowing agent blend comprising about 70 to about 87 weight percent of methyl formate; and
   expanding the formulation to form a substantially closed-cell, dimensionally stable foam article.

2. The thermoplastic polymer foam article of claim 1, wherein the thermoplastic polymer foam article is a sheet.

3. The thermoplastic polymer foam article of claim 2, wherein the sheet is thermoformable.

4. The thermoplastic polymer foam article of claim 1, wherein the blowing agent blend comprises about 13 to about 30 weight percent of ethane.

5. The thermoplastic polymer foam article of claim 1, wherein the thermoplastic polymer is an alkenyl aromatic polymer.

6. The thermoplastic polymer foam article of claim 1, wherein the thermoplastic polymer is an amorphous polymer selected from the group consisting of polystyrene, polycarbonate, poly(methyl methacrylate), poly(phenylene oxide), and mixtures thereof.

7. The thermoplastic polymer foam article of claim 1, wherein the thermoplastic polymer foam article has a substantially uniform density.

8. The thermoplastic polymer foam article of claim 1, wherein the thermoplastic polymer foam article has a density of about 1 $lb/ft^3$ to about 15 $lb/ft^3$.

9. A process for producing a thermoplastic polymer foam article comprising:
   preparing an expandable polymeric formulation comprising a thermoplastic polymer and a blowing agent blend comprising methyl formate and ethane, the blowing agent blend comprising about 70 to about 87 weight percent of methyl formate; and
   expanding the formulation to form a substantially closed-cell, dimensionally stable foam article.

10. The process of claim 9, wherein preparing the expandable polymeric formulation comprises:
    melting the thermoplastic polymer; and
    dissolving an effective amount of the blowing agent blend in the thermoplastic polymer to define the formulation.

11. The process of claim 9, wherein the thermoplastic polymer foam article is a sheet.

12. The process of claim 11, wherein the sheet is thermoformable.

13. The process of claim 9, wherein the blowing agent blend comprises about 13 to about 30 weight percent of ethane.

14. The process of claim 9, wherein the thermoplastic polymer is an alkenyl aromatic polymer.

15. The process of claim 9, wherein the thermoplastic polymer is an amorphous polymer selected from the group consisting of polystyrene, polycarbonate, poly(methyl methacrylate), poly(phenylene oxide), and mixtures thereof.

16. The process of claim 9, wherein the thermoplastic polymer foam article has a substantially uniform density.

17. The process of claim 9, wherein the thermoplastic polymer foam article has a density of about 1 $lb/ft^3$ to about 15 $lb/ft^3$.

* * * * *